(12) United States Patent
Hwang et al.

(10) Patent No.: US 7,830,409 B2
(45) Date of Patent: Nov. 9, 2010

(54) SPLIT SCREEN VIDEO IN A MULTIMEDIA COMMUNICATION SYSTEM

(76) Inventors: Cherng-Daw Hwang, 971 Dionne Way, San Jose, CA (US) 95133; Steven Wang, 10626 Felton Way, Cupertino, CA (US) 95014; Weiping Li, 159 S. California Ave., J103, Palo Alto, CA (US) 94306

( * ) Notice: Subject to any disclaimer, the term of this patent is extended or adjusted under 35 U.S.C. 154(b) by 1530 days.

(21) Appl. No.: 11/089,719

(22) Filed: Mar. 25, 2005

(65) Prior Publication Data
US 2006/0215765 A1 Sep. 28, 2006

(51) Int. Cl.
*H04N 7/14* (2006.01)
(52) U.S. Cl. .................................................. 348/14.13
(58) Field of Classification Search ............. 348/14.13, 348/14.01, 14.07, 14.12
See application file for complete search history.

(56) References Cited
U.S. PATENT DOCUMENTS

| | | | |
|---|---|---|---|
| 2001/0047517 A1 | 11/2001 | Christopoulos et al. | |
| 2002/0038234 A1* | 3/2002 | Fu et al. | 705/8 |
| 2005/0024487 A1 | 2/2005 | Chen | |
| 2005/0140780 A1* | 6/2005 | Yang et al. | 348/14.08 |
| 2007/0147804 A1* | 6/2007 | Zhang et al. | 386/131 |

FOREIGN PATENT DOCUMENTS

| EP | 1 363 458 A2 | 11/2003 |
|---|---|---|
| WO | WO 03/052613 A1 | 6/2003 |

OTHER PUBLICATIONS

Ming-Ting Sun, et al., "A Coded-Domain Video Combiner for Multipoint Continuous Presence Video Conferencing," XP011014437, IEEE Transactions on Circuits and Systems for Video Technology, vol. 7, No. 6, pp. 855-863 (Dec. 1997).
Peter van Beek, et al., "Metadata-Driven Multimedia Access," XP011093785, IEEE Signal Processing Magazine, vol. 20, No. 2, pp. 40-52 (Mar. 2, 2003).
Da-Jin Shiu, et al., "A DCT-Domain H.263 Based Video Combiner for Multipoint Continuous Presence Video Conferencing," XP010519359, Multimedia Computing and Systems, vol. 2, pp. 77-81 (Jun. 7, 1999).
Jose Friedman, "Data Alignment for Sub-Word parallelism in DSP," XP010370908, Signal Processing Systems, 1999, 1999 IEEE Workshop on Taipei, Taiwan, pp. 251-260 (Oct. 20-22, 1999).

(Continued)

*Primary Examiner*—Stella L Woo
(74) *Attorney, Agent, or Firm*—Gavrilovich, Dodd & Lindsey LLP

(57) ABSTRACT

A method is described for encoding video. A video sequence is captured at a full frame resolution. Boundaries for an inner region are identified within frames of the video sequence. The video sequence is encoded at the full frame resolution into a bitstream. The bitstream includes a sub-bitstream which encodes for the inner region. Data is embedded within the bitstream. The data identifies the sub-bitstream within the bitstream. In one aspect, the data is a header specifying the inner region. In another aspect, the encoding estimates motion for pixels within the inner region based on pixels within the inner region.

36 Claims, 18 Drawing Sheets

OTHER PUBLICATIONS

Hein Bles, et al., "A Collaborative Environment for Users of Advanced Scientific Instruments," XP010789030, Proceedings of the Third International Conference on Creating, Connecting, and Collaborating Through Computing, pp. 83-90 (Jan. 28-29, 2005).

PCT Notification of Transmittal of The International Search Report and the Written Opinion of the International Searching Authority or The Declaration for PCT Counterpart Application No. PCT/US2006/003194 Containing International Search Report (Nov. 11, 2006).

* cited by examiner

SPLIT SCREEN VIDEO IN A MULTIMEDIA COMMUNICATION SYSTEM

FIELD

Embodiments of the present invention relate to split screen video in a multimedia communication system. More particularly, embodiments of the present invention relate to systems and methods for bitstream domain video splitting.

BACKGROUND

Multi-party and multimedia communication in real time has been a challenging technical problem for a long time. The most straightforward way is for each user to send media data (such as video, audio, images, text, and documents) to every other user, as illustrated in FIG. 1.

Such a prior art mesh connection of users typically requires very high bandwidth because each user has to receive different media data from multiple users and each user has to send the identical media data to multiple users. The total bandwidth of the data traffic in the network would increase quickly with the number of users. The required processing power of each user terminal would also increase with the number of users. Therefore, such a mesh connection of multiple users is typically disadvantageous.

The prior art video conferencing system of FIG. 2 attempts to solve this problem by using a Multipoint Control Unit ("MCU") as a central connection point for all users.

To save bandwidth, the MCU receives encoded video bitstreams from all users, decodes them, mixes all or a selected number of video sequences into one video sequence, encodes the combined video sequence, and sends a single bitstream to each user individually. In the process of mixing multiple video sequences, the resolution of some input video sequences typically has to be reduced in order for the combined video sequence to fit into a given resolution. For example, if User 1, User 2, and User 3 use the Common Intermediate Format ("CIF") for their video, and User 4, User 5, and User 6 use the Quarter CIF ("QCIF") for their video, the video resolution of the first three users is 352×288 pixels and the video resolution of the last three users is 176×144 pixels. Assuming that the first four video sequences typically are mixed into a single CIF video sequence, the resolution of the first three video sequences has to be reduced from CIF to QCIF before they are combined with the fourth one into the output video sequence. FIG. 3 illustrates the process for this example. The choice of which video sequences are mixed together is typically made by either voice activated selection ("VAS") or chair control. In the above example, if VAS is used, four video sequences associated with the loudest four voices in the video conference are selected for mixing. If chair control is used, one of the users is designated as the chairperson and this user can determine which video sequences are mixed together.

With a single MCU, the number of users is typically limited because both bandwidth and processing power of the MCU would increase with the number of users. To handle a large number of simultaneous video conferences with many users, in the prior art multiple MCUs are cascaded, as illustrated in FIG. 4. In a traditional video conferencing system, there typically is a Gatekeeper that, among other things, keeps information about which users are connected to which MCUs and how the MCUs are cascaded so that the video calls can be made through appropriate MCUs between users. For each MCU, the connection to another MCU is typically treated the same as the connection to a user. For example, if a video conference involves the three users on MCU 1, two of the users on MCU 2, two of the users on MCU 3, and three of the users on MCU 4, each individual MCU mixes its own local video and sends the mixed video to its neighbor MCU as a single video bitstream. This means that the video from User 1.1 is sent to User 4.1 through three video mixers on MCU 1, MCU 3, and MCU 4.

One of the problems in such a prior art cascaded MCU video conferencing system is the end-to-end delay, especially on an IP network. First, video processing on each MCU introduces a delay. Second, each MCU typically has to wait for all relevant video packets to arrive before decoding and mixing multiple video sequences. There is also transmission delay. The total end-to-end delay can therefore sometimes be too long for users to have real-time interactive communication. The amount of delay typically increases with the number of cascaded MCUs in the delivery path between any two end-points.

Therefore, one disadvantage of a traditional prior art video conferencing system is the inability to handle many users. Another disadvantage of a traditional prior art video conferencing system is that typically the cost per user is relatively high. Another disadvantage is that the complexity of call setup typically can become very high very quickly when the number of users and cascaded MCUs increases.

SUMMARY

A method is described for encoding video. A video sequence is captured at a full frame resolution. Boundaries for an inner region are identified within frames of the video sequence. The video sequence is encoded at the full frame resolution into a bitstream. The bitstream includes a sub-bitstream which encodes for the inner region. Data is embedded within the bitstream. The data identifies the sub-bitstream within the bitstream. In one aspect, the data is a header specifying the inner region. In another aspect, the encoding estimates motion for pixels within the inner region based on pixels within the inner region.

A method is described including receiving an encoded bitstream which encodes for a video sequence at a full frame resolution. A sub-bitstream within the bitstream is identified. The sub-bitstream encodes for an inner region within frames of the video sequence. The inner region has a first resolution lower than the full frame resolution. Bits of the bitstream are discarded to obtain the sub-bitstream.

A method is described including identifying a split screen layout for presenting video sequences from a plurality of end points. A capability of an end point is determined, including a first resolution for capturing a video sequence at the end point. A second resolution for displaying the video sequence within the split screen layout is determined. A determination is made as to whether cutting the video sequence from the first resolution to the second resolution is acceptable. If the cutting is acceptable, the end point is instructed to encode the video sequence into a bitstream at the first resolution. The bitstream includes a sub-bitstream encoding for an inner region of the video sequence at the second resolution.

A graphical user interface is described including a split screen window within the graphical user interface. The window includes a plurality of regions, each region to display a video sequence received from one of a plurality of end points. A selection of a first region within the window can be received. A command to drag the selected first region over a second region within the window can be received. A command to drop the selected first region over the second region can be received. In response to receiving the command to drop the selected first region, positions for the first region and the second region within the window are switched.

Other features and advantages of the present invention will be apparent from the accompanying drawings and from the detailed description that follows.

BRIEF DESCRIPTION OF THE DRAWINGS

Embodiments of the present invention are illustrated by way of example and not limitation in the accompanying drawings, in which like references indicate similar elements, and in which.

DETAILED DESCRIPTION

Figure 1:
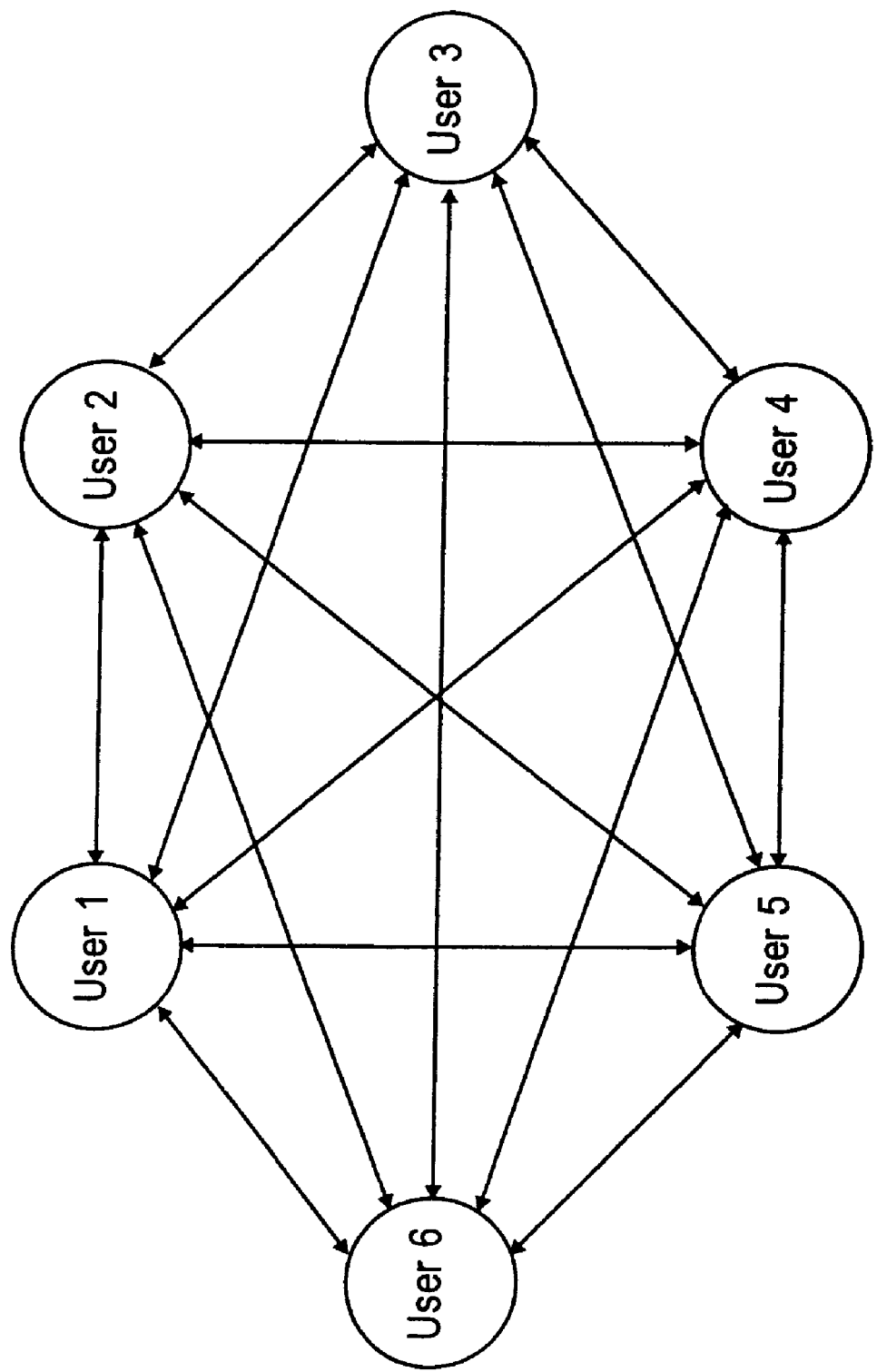
FIG. 1 shows a prior art mesh network.

Embodiments of the invention help to overcome problems with typical prior art video conferencing systems and add functionality for real-time multimedia communication and collaboration. A component of a system architecture of an embodiment of the invention is the Multimedia Application Routing Server ("MARS") that is capable of both routing and processing multimedia data. The MARS unit is also referred to as a real-time routing server. Other components of the system include an end point ("EP") and a group server ("GS"). The end point is also referred to as an end-point processing device.

In a video conferencing system, various users participate from their respective end points. These end points are personal computing devices which have an attached video camera and a headset (or microphone and speaker), and are connected to a network including a MARS. Each end point transmits its respective video as a bitstream to the MARS. This bitstream encodes for the full frame size/resolution (e.g. 320×240 pixels) as captured by the end point's video camera. As the MARS receives video from each of the end points, it then redistributes the video to destination end points, which may be the same participants contributing the video. The video streams received at the destination end point are presented within a single window in a split screen format, where each area in the split screen corresponds to an end point, and each area's content is provided by a separate bitstream received from the MARS. Due to screen area limitations ("screen real estate") of the split screen format, each of the video sources may be displayed at a lower resolution than its full frame resolution as captured at the source. Additionally, rather than reducing the overall resolution of the full frame, only an inner size or cropped portion of the frame is presented within the split screen window. This offsets some of the drawbacks of the lower resolution picture, by maximizing the display of the center portion of the video frame, which most likely contains the most significant and interesting content, such as a user's face, while omitting unnecessary background content.

Because the MARS routes video received from the various end points, it is necessary to minimize the amount of processing performed on the MARS to achieve an efficient and high degree of performance, as well as to improve the user experience at the destination end points. One technique to reduce the amount of processing at the MARS is accomplished by signaling to each of the end points, before the end point encodes its video, what the exact inner frame position and resolution their respective video content will be displayed in at the destination end point. The source end point then takes this information into account when encoding its video content into an output bitstream. The resulting bitstream includes a sub-bitstream which encodes only for the inner (cropped) portion of the frame. Once the full bitstream is received at the MARS, the MARS can obtain just the inner portion of the video frame, without having to decode the bitstream, simply by discarding all of the bitstream data except the sub-bitstream portion. Thus, processing time for a bitstream is minimized at the MARS, since the MARS does not need to fully decode the bitstream, down-sample or crop the frame, then re-encode a new bitstream. Rather, video encoding only occurs once at the source end point, and the MARS simply routes only the relevant portion of the bitstream to the destination end point for decoding. Additional features are described in greater detail below.

Figure 5:
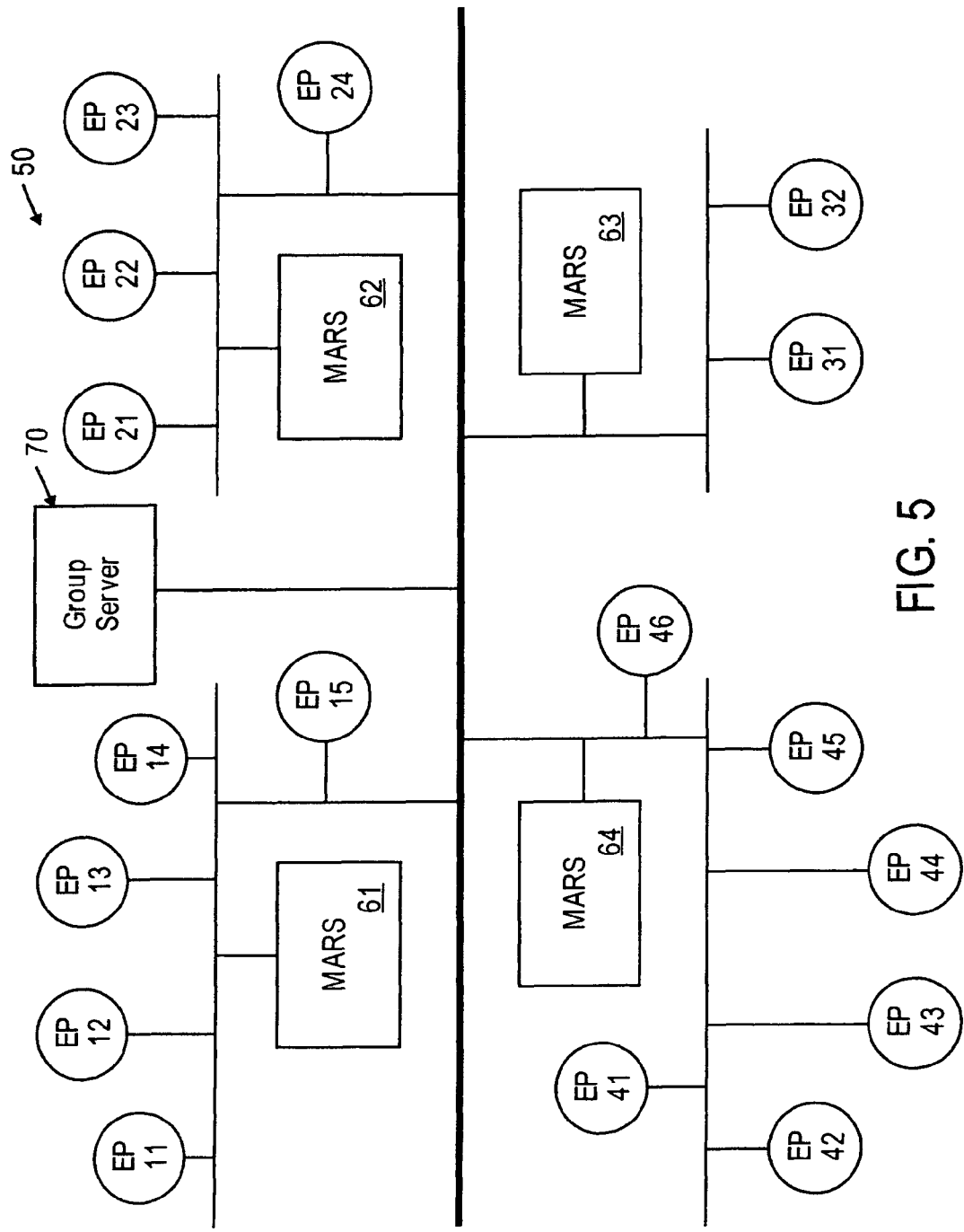
FIG. 5 shows an embodiment of a system including a group server, multimedia application routing servers, and end-point devices.

FIG. 5 shows system 50 that provides real-time multimedia communication and collaboration. System 50 is an example of a system having four MARS units 61-64. The real-time routing servers 61-64 are coupled via a network to group server 70. The MARS units 61-64 and group server 70 are also coupled via a network to end-point processing devices 11-15, 21-24, 31-32, and 41-46. All components of system 50—the MARS units 61-64, the group server 70, and EP devices 11-15, 21-24, 31-32, and 41-46—are coupled to an Internet Protocol ("IP") network and are identified by their IP address. Alternatively, other types of networks and other types of addressing are used.

For other embodiments, more or fewer MARS devices, group servers, and EP devices can be part of multimedia communication and collaboration system 50. For example, there could be one MARS device, one group server, and several EP devices. As another example, there could be ten MARS units, one group server, and 45 EP processing devices.

Users of system 50 interact with end point processing devices 11-15, 21-24, 31-32, and 41-46. System 50 allows the users of the end-point processing devices to send video in real time with minimal delay. The users can therefore communicate and collaborate. In addition to real-time video, system 50 also allows the users to send real-time audio with minimal delay. System 50 also allows the users to send other digital information, such as images, text, and documents. Users can thus establish real-time multimedia communication sessions with each other using system 50.

An EP device, such as one of the EP devices 11-15, 21-24, 31-32, and 41-46 of FIG. 5, may be a personal computer ("PC") running as a software terminal. The EP device may be a dedicated hardware device connection with user interface devices. The EP device may also be a combination of a PC and a hardware device. An EP device is used for a human user to schedule and conduct a multimedia communication session, such as a video conference, web conference, or online meeting. An EP device is capable of capturing inputs from user interface devices, such as a video camera, an audio microphone, a pointing device (such as a mouse), a typing device such as a keyboard, and any image/text display on the monitor. An EP device is also capable of sending outputs to user interface devices such as a PC monitor, a TV monitor, a speaker, and an earphone.

An EP device encodes video, audio, image, and text according to the network bandwidth and the computing power of the EP device. It sends encoded data to the MARS it is associated to. At the same time, the EP device receives coded media data from its associated MARS. The EP device decodes the data and sends decoded data to the output devices, such as the earphone or speaker for audio and the PC monitor for displaying video, image, and text. In addition to media data, an EP device also processes communication messages transmitted between the EP device and its associated MARS. The messages include scheduling a meeting, joining a meeting, inviting another user to a meeting, exiting a meeting, setting up a call, answering a call, ending a call, taking control of a meeting, arranging video positions of the meeting participants, updating buddy list status, checking the network connection with MARS, and so on.

Each user of system 50 is registered into the group server database and identified by a unique identification such as a user email address. To conduct a session, a user is associated with an end point, an end point is associated with a MARS, and a MARS is associated with a group server.

The group server 70 manages multimedia communications sessions over the network of system 50. In the group server 70, several software processes are running to manage all communication sessions within its group of users and to exchange information with other group servers for conducting sessions across groups. For one embodiment, the group server 70 uses the Linux operating system. The software processes running in the group server 70 include a provisioning server, a web server, and processes relating to multimedia collaboration and calendar management.

The functionality of a MARS device can be divided into two broad categories. One is to route media data and the other is to process media data. Unlike certain prior art cascading MCUs in a traditional prior art video conferencing system where static data paths are typically determined at the time of setting up the system, MARS dynamically finds the best route with enough bandwidth to deliver media data from source to destination with the shortest delay. Also unlike certain prior art cascading MCUs in a traditional prior art video conferencing system where video may be processed in every MCU along a path from source to destination, the architecture of system 50 guarantees that video processing is performed at most in two MARS units from a video source to any given destination.

Figure 6:
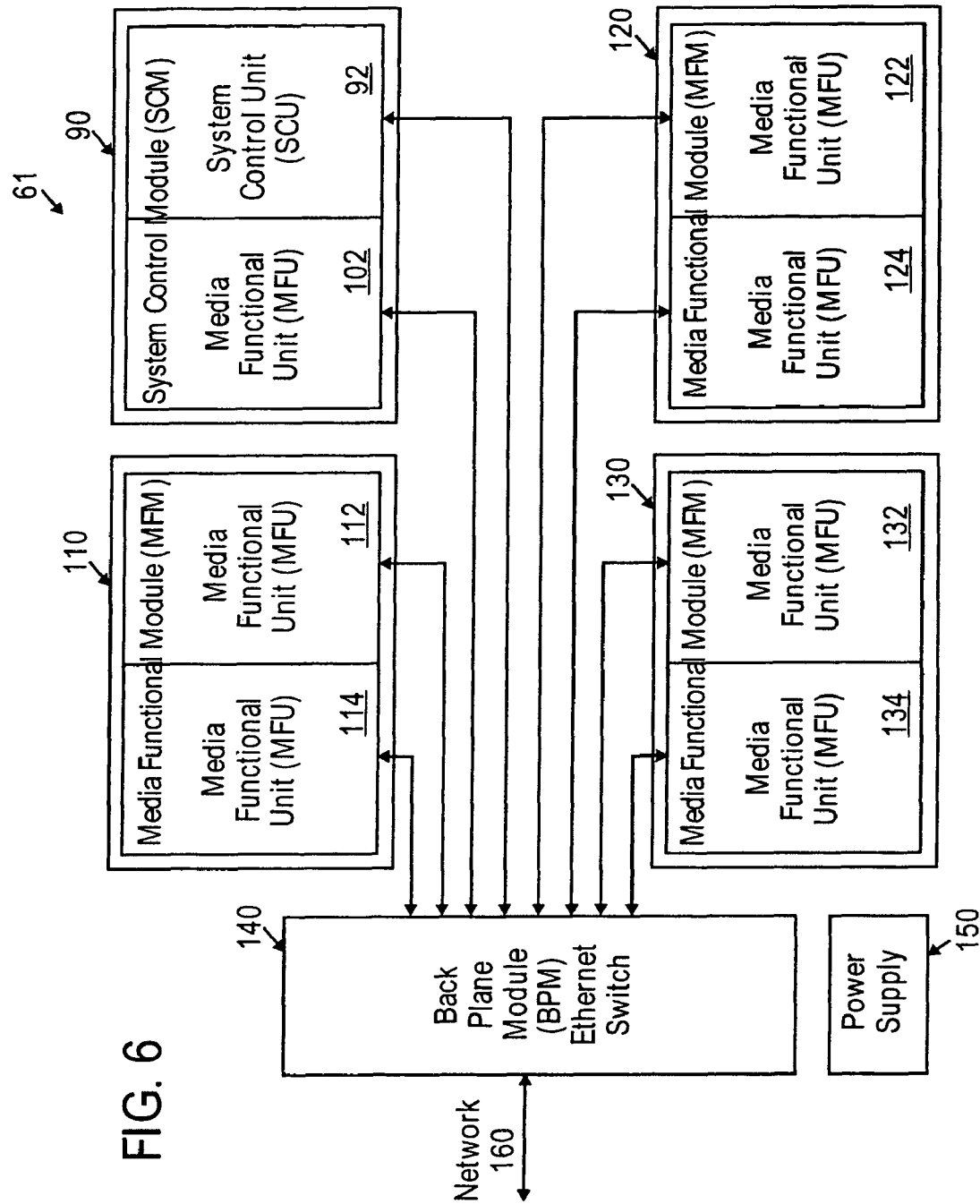
FIG. 6 is a block diagram of a multimedia application routing server.

FIG. 6 is block diagram of multimedia application routing server 61, also referred to as real-time routing server 61. The MARS unit 61 includes a system control module 90 ("SCM") and media functional modules ("MFMs") 110, 120, and 130. Media functional modules 110, 120, and 130 are also referred to as multi-function modules. The system control module 90 and the media functional modules 110, 120, and 130 are coupled to backplane module ("BPM") Ethernet switch 140. Alternatively, another type of switch can be used.

For one embodiment of the invention, BPM Ethernet switch 140 is a model BCM 5646 Ethernet switch supplied by Broadcom Corporation of Irvine, Calif. Power supply 150 is coupled to Ethernet switch 140 and the other components. Backplane module Ethernet switch 140 is in turn coupled to internet protocol network 160.

The system control module 90 includes system control unit (SCU) 92 and media functional unit (MFU) 102. Media functional module 110 includes media functional units 112 and 114. Media functional module 120 includes media functional units 122 and 124. Media functional module 130 includes media functional units 132 and 134. Media functional units 102, 112, 114, 122, 124, 137, and 134 are also referred to as multifunction units.

The architecture of MARS 61 provides high speed multimedia and video processing. For one embodiment of the invention, MARS 61 has a benchmark speed of approximately 120,000 million instructions per second (MIPS). MARS unit 61 acts as both a router and a server for a network. The architecture of MARS 61 is geared towards high speed real time video and multimedia processing rather than large storage. The MARS unit 61 thus allows for real-time video communication and collaboration sessions.

Figure 7:
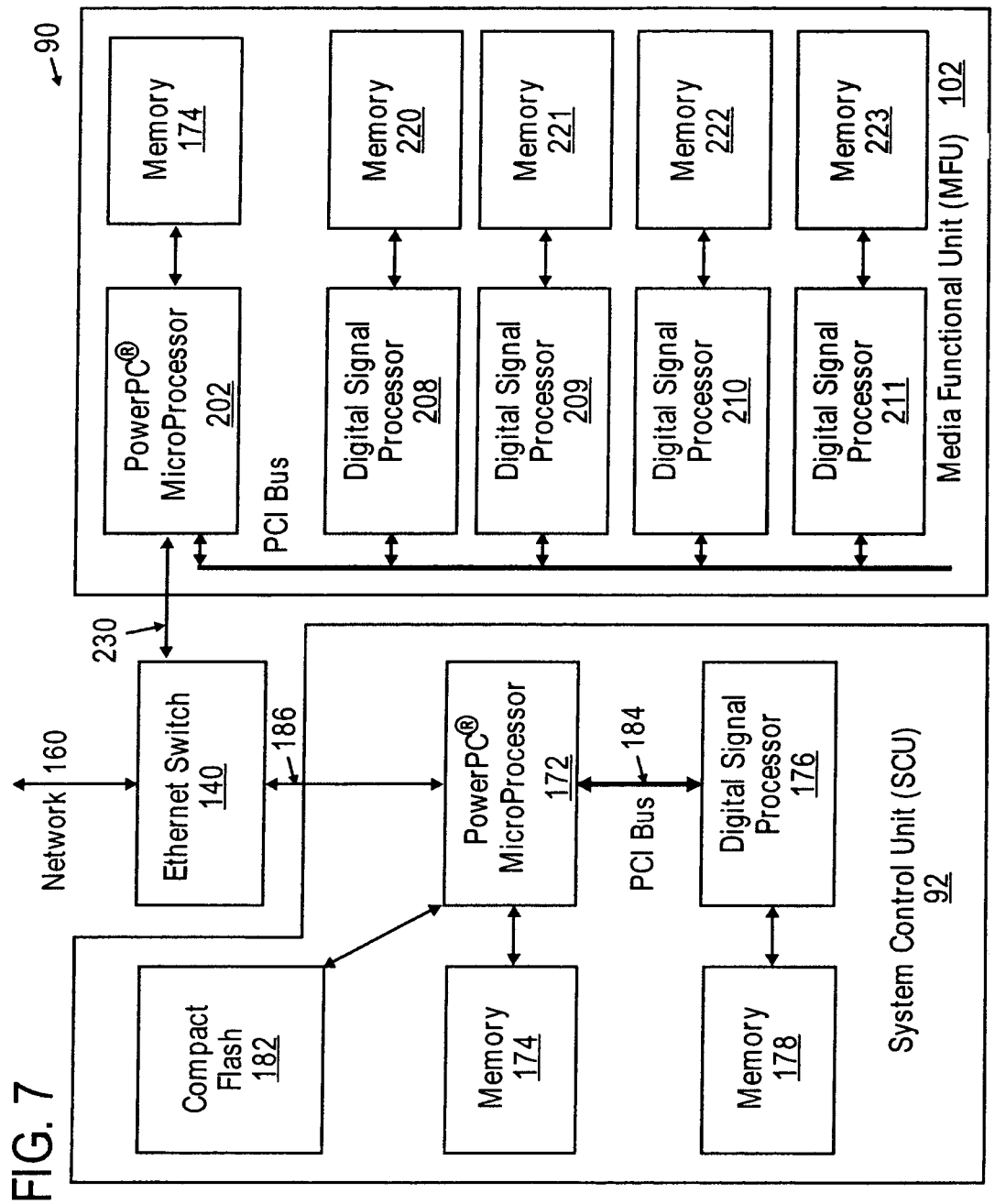
FIG. 7 is a block diagram of system control module of a multimedia application routing server.

FIG. 7 is a block diagram of system control module 90, which includes system control unit 92 and media functional unit 102. System control unit 92 controls the real-time routing server 61. System control unit 92 includes a PowerPC® microprocessor 172 supplied by Motorola Corporation of Schaumburg, Ill. The PowerPC microprocessor 172 is coupled to a compact flash card 182. The compact flash card contains the Linux operating system for the microprocessor 172. The compact flash card 182 acts in a way analogous to a hard disk drive in a personal computer. Microprocessor 172 is also coupled to synchronous DRAM ("SDRAM") memory 174. Memory 174 holds code and data for execution by microprocessor 172. For one embodiment of the invention, memory 174 is 32 megabytes in size. For alternative embodiments, memory 174 can be smaller or larger than 32 megabytes.

PowerPC microprocessor 172 is coupled to digital signal processor ("DSP") 176 via PCI bus 184. For one embodiment, DSP 176 is a model TMS 320C6415 DSP supplied by Texas Instruments Inc. of Dallas, Tex. DSP 176 is a media processing resource for system control unit 92. Digital signal processor 176 is coupled to a 32 megabytes SDRAM memory 178. Alternative embodiments have a memory 178 that is larger or smaller.

PowerPC microprocessor 172 is coupled to Ethernet switch 140 via lines 186. Ethernet switch 140 is in turn coupled to network 160. Media functional unit 102 includes a Power PC® microprocessor 202 that is coupled to a 32 megabytes SDRAM memory 204.

PowerPC microprocessor 202 is coupled to PCI bus 206. PCI bus 206 is in turn coupled to digital signal processors 208 thru 211. Each digital signal processors 208 thru 211 is a model TMS320C6415 DSP supplied by Texas Instruments Inc. of Dallas, Tex. Digital signal processor 208 is coupled to SDRAM memory 220. Digital signal processor 209 is coupled to SDRAM memory 221. Digital signal processor 210 is coupled to SDRAM memory 222. Digital signal processor 211 is coupled to SDRAM memory 223. For one embodiment, each of SDRAM memories 220 thru 223 comprises a 32 megabyte memory.

PowerPC microprocessor 202 is also coupled to Ethernet switch 140 via lines 230.

Figure 8:
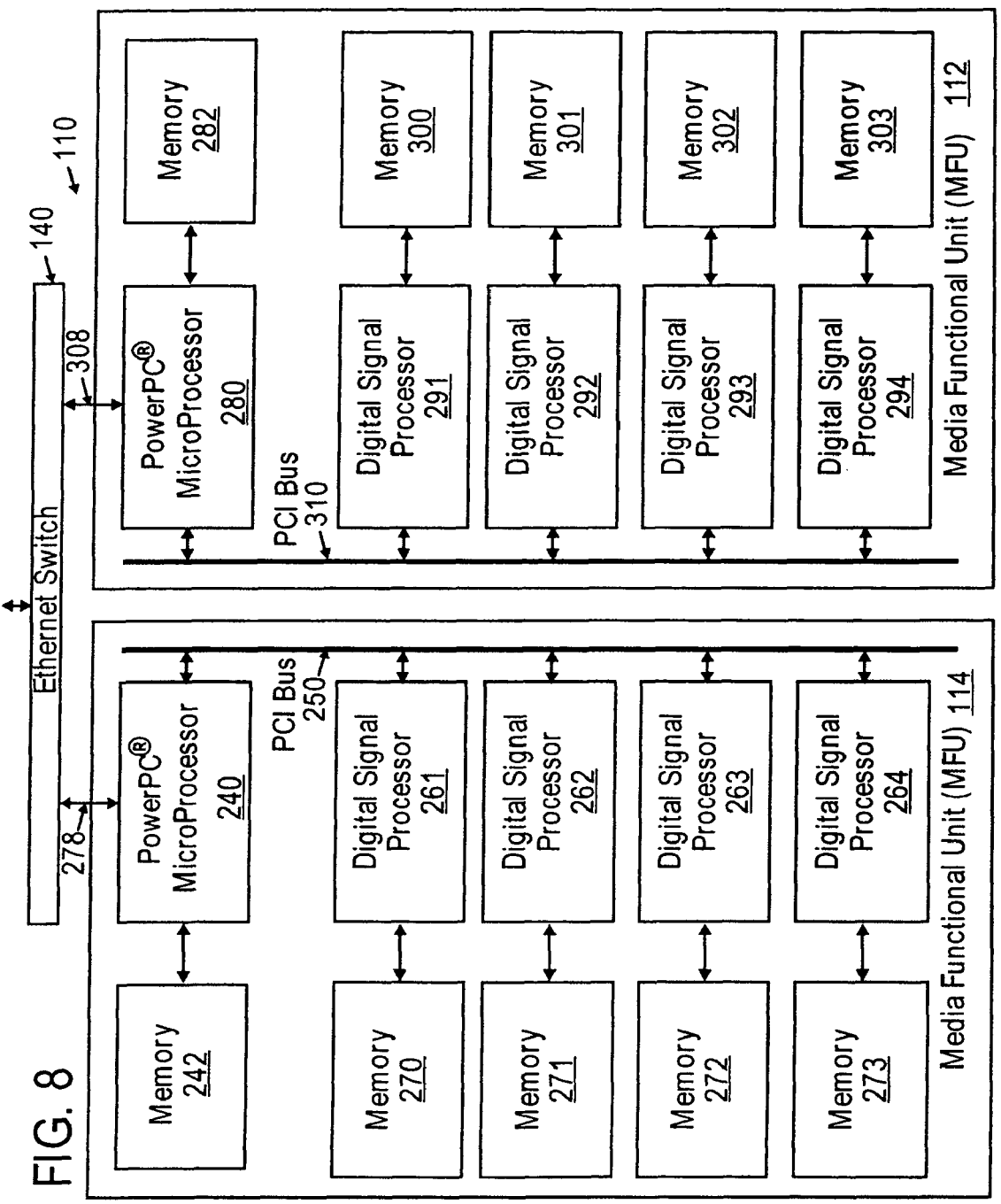
FIG. 8 is a block diagram of a media functional module of a multimedia application routing server.

FIG. 8 includes a block diagram of media functional module 110, which includes media functional units 112 and 114. Media functional unit 112 includes a PowerPC microprocessor 280 that is coupled to 32 megabytes of SDRAM memory 282. PowerPC microprocessor is coupled to PCI bus 310. The PowerPC microprocessor is also coupled to Ethernet switch 140 via lines 308.

PC bus 310 is in turn coupled to digital signal processors 291 thru 294. Digital signal processor 291 is coupled to 32 megabytes SDRAM memory 300. Digital signal processor 292 is coupled to 32 megabytes SDRAM memory 301. Digital signal processor 293 is coupled to 32 megabytes SDRAM memory 302. Digital signal processor 294 is coupled to 32 megabytes SDRAM memory 303.

Media functional unit 114 is similar to media functional unit 112. Media functional unit 114 includes a PowerPC microprocessor 240 coupled to SDRAM memory 242. The PowerPC microprocessor 240 is coupled to Ethernet switch 140 via lines 278. The PowerPC microprocessor 240 is also coupled to PCI bus 250.

PCI bus 250 is in turn coupled to digital signal processors 261 thru 264. Digital signal processor 261 is coupled to memory 270. Digital signal processor 262 is coupled to memory 271. Digital signal processor 263 is coupled to memory 272. Digital signal processor 264 is coupled to memory 273. Each of memories 270 thru 273 is a 32 megabytes SDRAM memory. For alternative embodiments, other sizes of memory can be used.

The media functional modules 120 and 130 shown in FIG. 6 are similar to media functional module 110.

Figure 4:
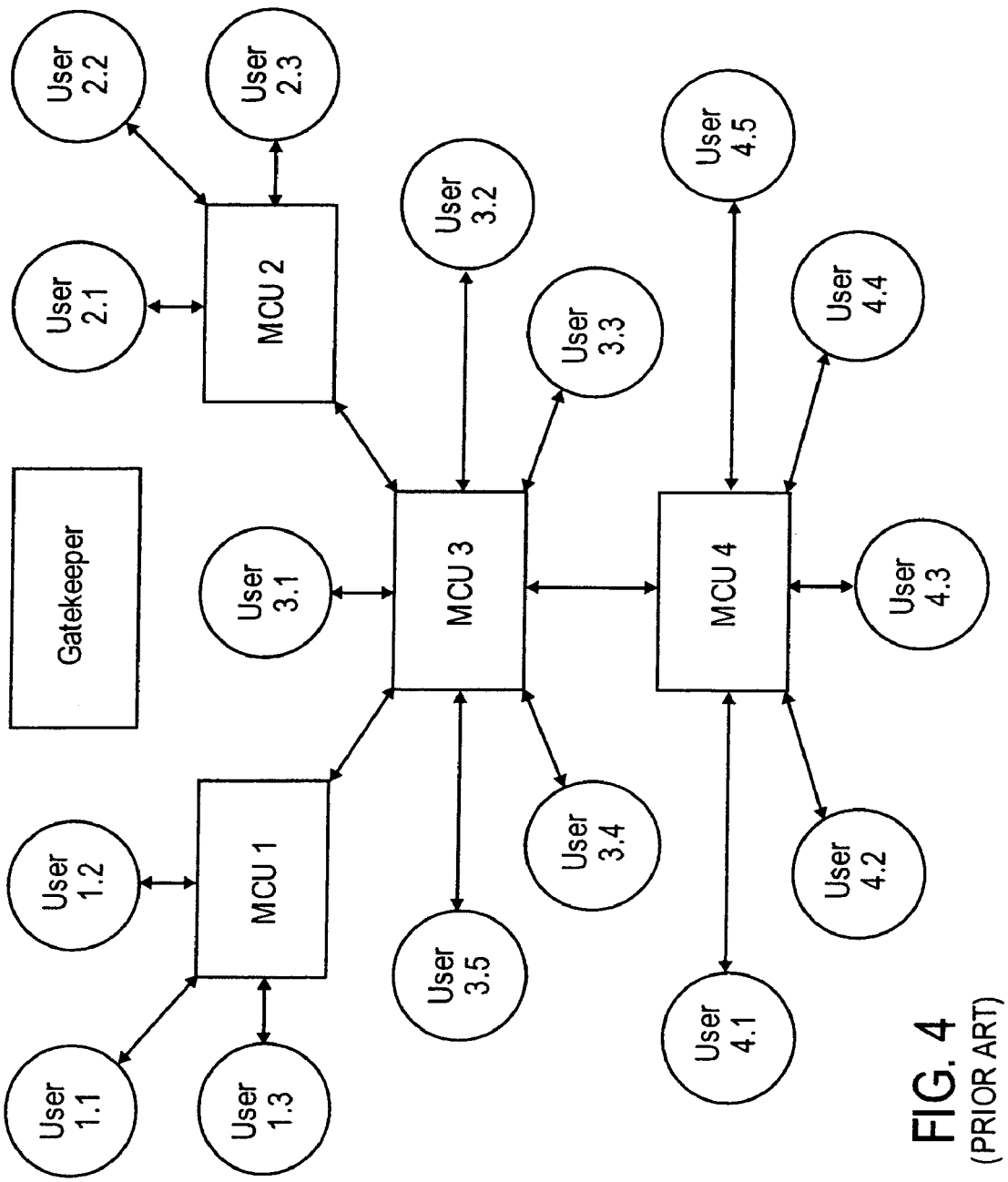
FIG. 4 shows cascaded multipoint control units in a prior art video conferencing system.

MARS 61 can route media data and process media data. The system control unit 92 of MARS 61 is used to route media data. The digital signal processors of MARS 61, such as digital signal processors 261 thru 264, act as digital media processing resources. Unlike cascading MCUs in prior art video conferencing systems, where video may be processed in every MCU along a path from source to destination (e.g. as described above with respect to FIG. 4), embodiments of the present invention guarantee that video processing is performed at most in two MARS units from a video source to any given destination.

Figure 9:
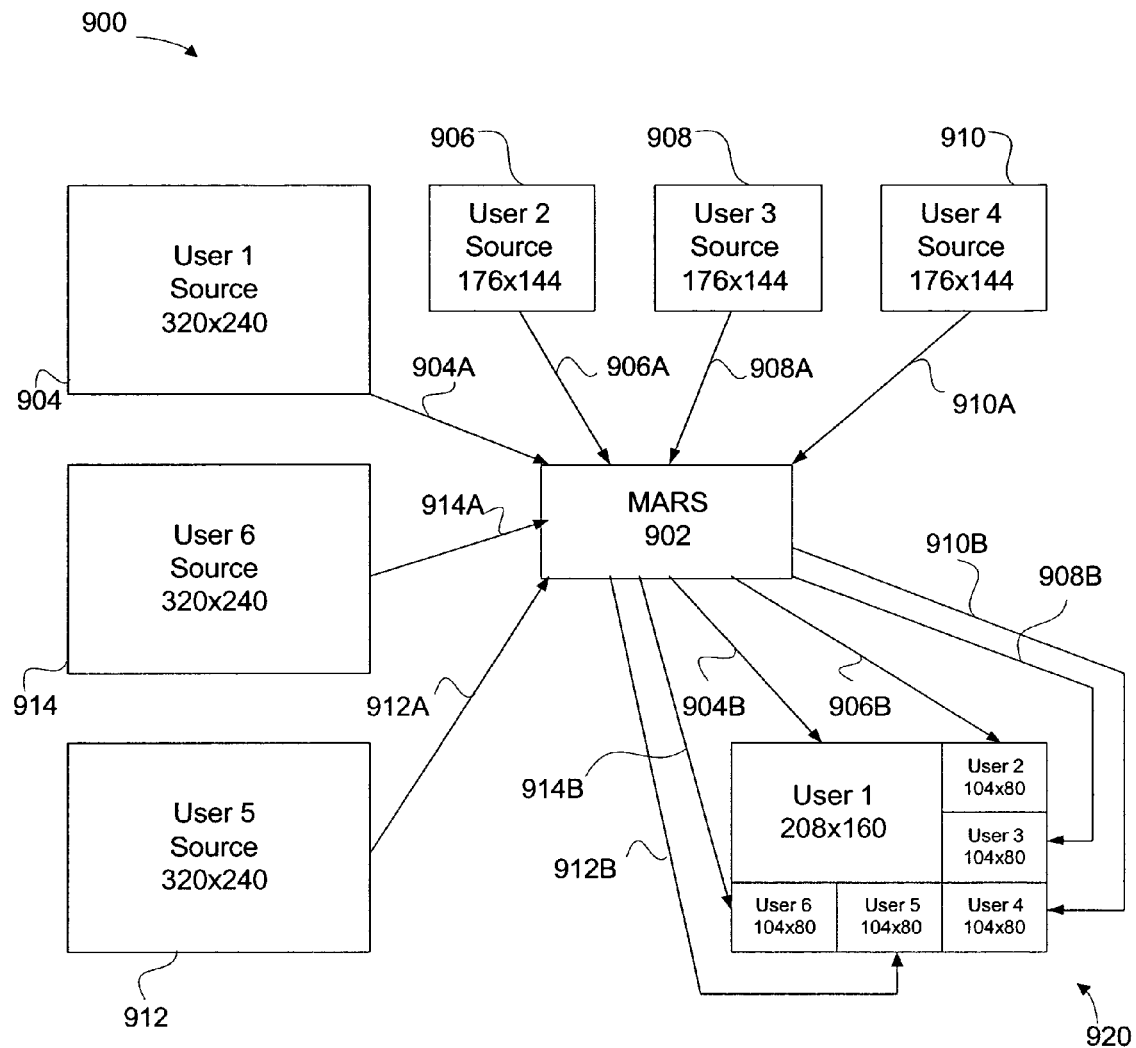
FIG. 9 is a block diagram of end points in communication with a multimedia application routing server.

Because different user end points (EPs) may have different processing power and the network connections may have different bandwidths between EPs and a MARS or between two MARS units, the objective of video processing for embodiments of the invention is to ensure the best video quality under a given video source, a given bandwidth, and given destination EP computing power. For an embodiment, the technique for video processing includes bitstream domain video splitting ("BDVS"), transrating, and down-sampling. FIG. 9 illustrates an embodiment of a system 900, in which MARS 902 determines which operation is to be applied on a plurality of video bitstreams 904A, 906A, 908A, 910A, 912A and 914A. Video content for each of the six video sources 904, 906, 908, 910, 912 and 914 is sent through the MARS to the same destination end point 920. Each video source 904-914 corresponds to a respective EP from which, for example, a user participates in a video conference. Three of the six source EPs (904, 912, 914) are capable of capturing and encoding video at a resolution of 320×240 pixels per frame and the other three source EPs (906, 908, 910) are able to capture and encode video at a resolution of 176×144 pixels. The destination EP 920 is able to decode one video bitstream with a resolution of 208×160 pixels per frame and five video bitstreams each with a resolution of 104×80 pixels per frame. As illustrated in FIG. 9, the destination EP 920 presents the decoded bitstreams in a "5+1" split screen format, in which video content for five sources are each presented at the same resolution (e.g. 104×80 pixels), and video content for one source is presented at a larger resolution (e.g. 208×160 pixels). Therefore, for this exemplary embodiment, MARS 902 receives six input video bitstreams (904A, 906A, 908A, 910A, 912A, 914A) at the full source resolutions and converts them into six output video bitstreams (904B, 906B, 908B, 910B, 912B, 914B) at the destination EP 920 resolutions. More specifically, the input video of EP 904 has to be converted from 320×240 to 208×160, the inputs from EPs 906, 908 and 910 have to be converted from 176×144 to 104×80, and the inputs from EPs 912 and 914 have to be converted from 320×240 to 104×80.

Because the output resolution is lower than the input resolution in each of the exemplary cases, one implementation could be for MARS 902 to decode every input bitstream, reduce the video resolution in the pixel domain, re-encode the reduced-resolution video, and then send the re-encoded bitstream to the destination EP. Reduction of video resolution is achieved by either down-sampling the input video pixels or cutting/cropping out some video pixels around the picture borders. Down-sampling requires complex computations, however, because a low-pass filtering operation is needed to prevent aliasing artifacts in the picture. Furthermore, down-sampling from an arbitrary resolution to another arbitrary resolution requires more computations than a less complex 2:1 down-sampling in each dimension. On the other hand, cutting/cropping out some pixels around the picture borders is a much simpler operation, but results in the loss of some of the picture scene. If the ratio of input and output resolutions after cutting is too large, e.g., an input of 320×240 and an output of 104×80, too much scene would be cut out. Therefore, for an embodiment, MARS 902 is able to make an intelligent determination to perform either down-sampling or cutting to achieve the optimal tradeoff between computing/processing requirements and preservation of a video scene.

Although a cutting operation itself is relatively simple, decoding and re-encoding operations still require high computing power on MARS 902. Moreover, the decoding and re-encoding of a video sequence may introduce additional artifacts causing video quality degradation. Accordingly, for an embodiment of the invention, to eliminate the need for decoding and re-encoding operations at MARS 902 in the case of cutting out pixels of the video scene (cropping), a bitstream domain video splitting (BDVS) operation is implemented to achieve the same goal with much lower computing requirements. Bitstream domain video splitting refers to the MARS's ability to split data for the inner size of a video sequence from within the bitstream domain, without having to first decode the bitstream.

To use BDVS in MARS 902, a corresponding EP encodes a video sequence in such a way that the central portion of the video picture can be split out of the original video picture in the bitstream domain at MARS 902, without requiring decoding, cutting, and re-encoding. For example, the source video resolution of EP 904 is 320×240 pixels per frame and is to be converted to 208×160 pixels per frame for the destination EP

920. Using BDVS, a video encoder at EP 904 encodes video originating at EP 904 into a bitstream 904A with a resolution of 320×240. Bitstream 904A also includes a sub-bitstream with a resolution of 208×160. This sub-bitstream encodes only for an inner region of the video frame. This may be better understood by reference to FIG. 10, which illustrates an exemplary video frame 1000. The outer size 1020 (or full frame size) of frame 1000 is 320×240 pixels. The bitstream 904A encodes for the outer size frame 1020. Frame 1000 also includes an inner size 1040 (or inner region) that has a resolution of 208×160 pixels. The boundaries of inner size 1040 define a portion of the full frame scene that is encoded by the sub-bitstream within bitstream 904A. The inner size 1040 represents only the central portion of the original or full video picture, as may result from cropping or cutting an outer border of the full frame 1000. Referring again to FIG. 9, at MARS 902, the sub-bitstream can be split out of the main bitstream without decoding, cutting, and re-encoding. The sub-bitstream is then sent as an output bitstream 904B from MARS 902 to the destination EP 920, which then decodes it, thereby reproduces the central portion of the original video picture (e.g. 1040 of FIG. 10).

The video sequences for EPs 906, 908 and 910 are encoded in a similar manner. Specifically, using EP 906 as an example, the video encoder at EP 906 generates a bitstream 906A with a full resolution of 176×144 pixels, which includes therein a sub-bitstream with a resolution of 104×80 pixels. As above, MARS 902 receives the full bitstream 906A, then splits the sub-bitstream out of the main bitstream 906A without having to decode, cut, and re-encode the bitstream. The split-out sub-bitstream is then sent as output bitstream 906B to the destination EP 920.

For EPs 912 and 914, simple cutting from a resolution of 320×240 pixels to 104×80 pixels would lose too much of the video scene, and down-sampling from a resolution of 320×240 pixels to 104×80 pixels would require too much computation. Therefore, for an embodiment, BDVS is combined with 2:1 down-sampling to achieve an optimal balance. Using EP 912 as an example, a video encoder at EP 912 generates a bitstream with a resolution of 320×240 pixels, which includes a sub-bitstream with a resolution of 208×160 pixels. This operation is similar to the encoding operation for EP 904. However, once MARS 902 receives this bitstream from EP 912, MARS 902 splits the sub-bitstream out of the main bitstream 912A. Instead of merely sending the sub-bitstream to the destination EP 920 as in the case for EP 904, MARS 902 performs a 2:1 down-sampling operation to convert the 208×160 pixels video to 104×80 pixels. MARS 902 then encodes the 104×80 pixels video, and sends the bitstream 912B to the destination EP 920.

As described in the Background, traditional video conferencing systems mix video from multiple users in an MCU, re-encode the mixed video as one bitstream, and send the single bitstream of the mixed video to an EP. In contrast, the system 900 illustrated in FIG. 9, MARS 902 processes individual bitstreams (904A, 906A, 908A, 910A, 912A, 914A) but does not mix video from different sources together into a single bitstream. If a certain video arrangement and layout is desired as shown in the destination EP 920 of FIG. 9, the EP 920 positions each individual video into the correct position in the specified split screen layout. Thus, MARS performs either splitting or split-down-sampling on individual video bitstreams, then sends just enough data of the individual video to the destination EP 920 as required by the layout of the destination EP 920. Thus, in a sense, the destination EP 920 performs the mixing task of the individual bitstreams provided by MARS 902. Therefore, there is no need for MARS 902 to wait to receive multiple video bitstreams for processing video, no matter how many MARS units the video bitstreams have to go through along the path from their sources to the destinations. As compared to cascading MCUs, in which the end-to-end delay increases with the number of cascaded MCUs, the end-to-end delay of sending video from source to destination in the system 900 of FIG. 9 is dramatically reduced.

Figure 2:
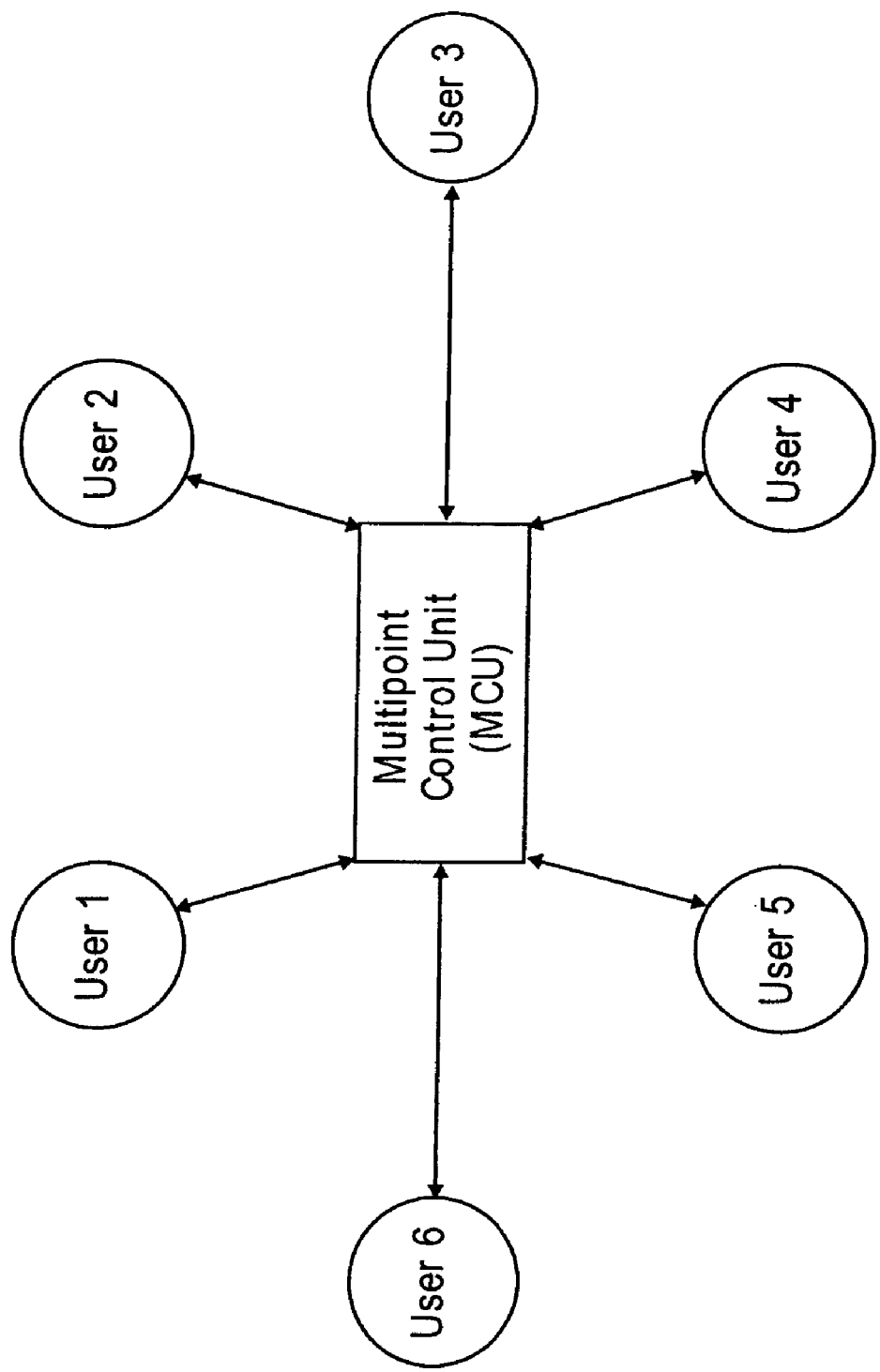
FIG. 2 illustrates a prior art video conferencing system with a single multipoint control unit.
Figure 3:
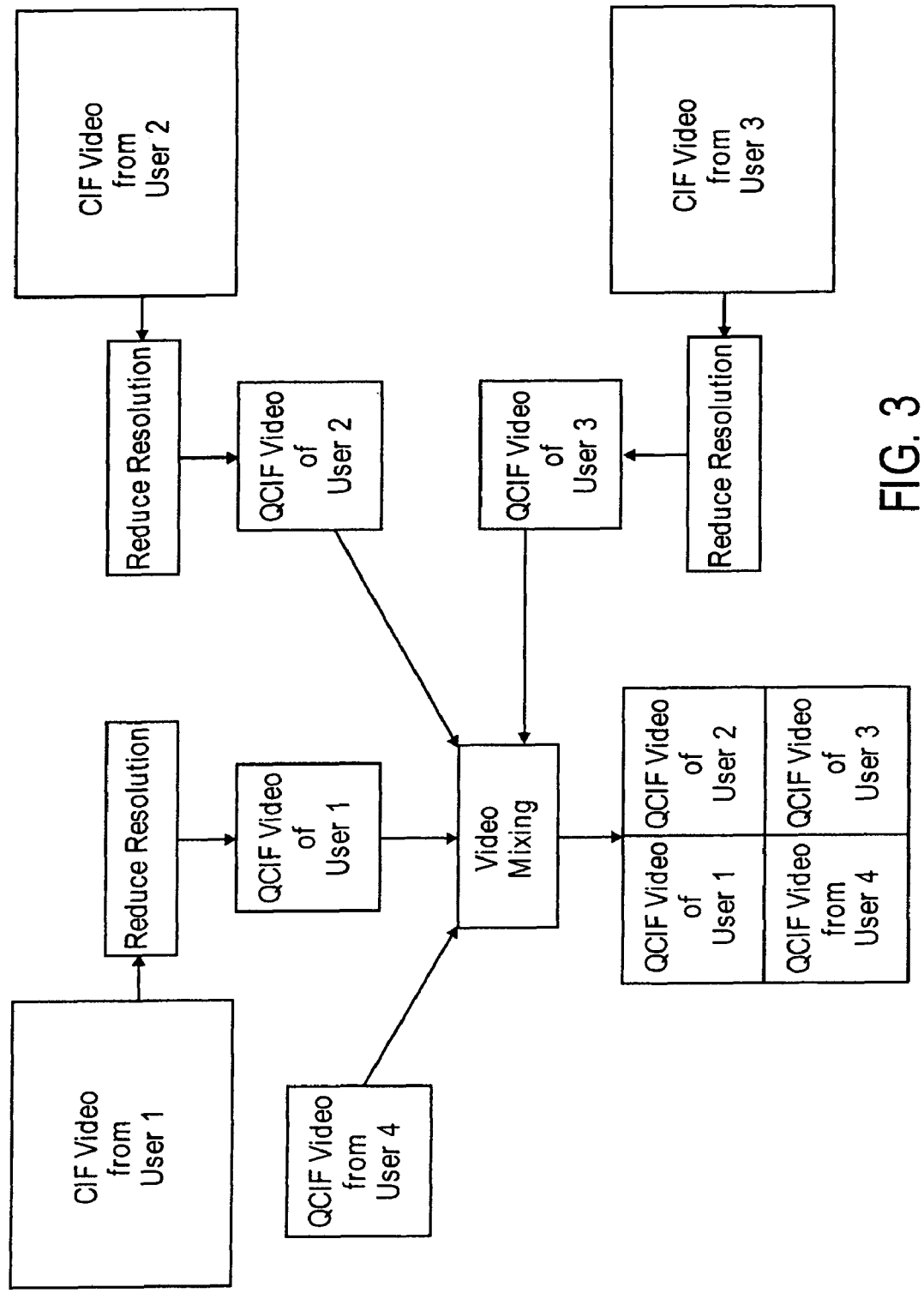
FIG. 3 shows a prior art example of mixing four video sequences into one in a multipoint control unit.

Another important feature of an embodiment of the present invention is the bandwidth characteristics of the MARS system. As described above, the MARS receives the full frame bitstream from an end point. The MARS then cuts out the sub-bitstream, and forwards each sub-bitstream to a destination endpoint. Thus, for a 5+1 layout, as in 920 of FIG. 9, the MARS delivers a total of six individual bitstreams from the MARS to the destination end point, each of the bitstreams representing only the sub-bitstream portion. Thus, the sum total bitrate of the six sub-bitstreams transmitted from the MARS to an individual destination end point only includes enough bits as are necessary to fill the dimensions of the split screen window with video content. In other words, the MARS transmits only the pixels actually needed to fill the split screen window (i.e. only the sub-bitstream). Because of this, the destination end point does not need to do any cutting of pixels; the end point merely needs to decode each of the received bitstreams and display it in the appropriate location of the split screen window. Thus, the MARS system provides comparable bandwidth performance as with the conventional MCU systems illustrated in FIGS. 2 and 3, which send a single combined bitstream to each individual user. However, the MARS system lacks the drawbacks of the MCU systems, such as increased processing in the form of multiple decoding operations and mixing of video at the MCU, which can lead to degradation of the video picture quality. Instead, the MARS system provides comparable bitrate performance, while only requiring a single encoding operation (at the source end point) and a single decoding operation (at the destination end point).

Figure 11:
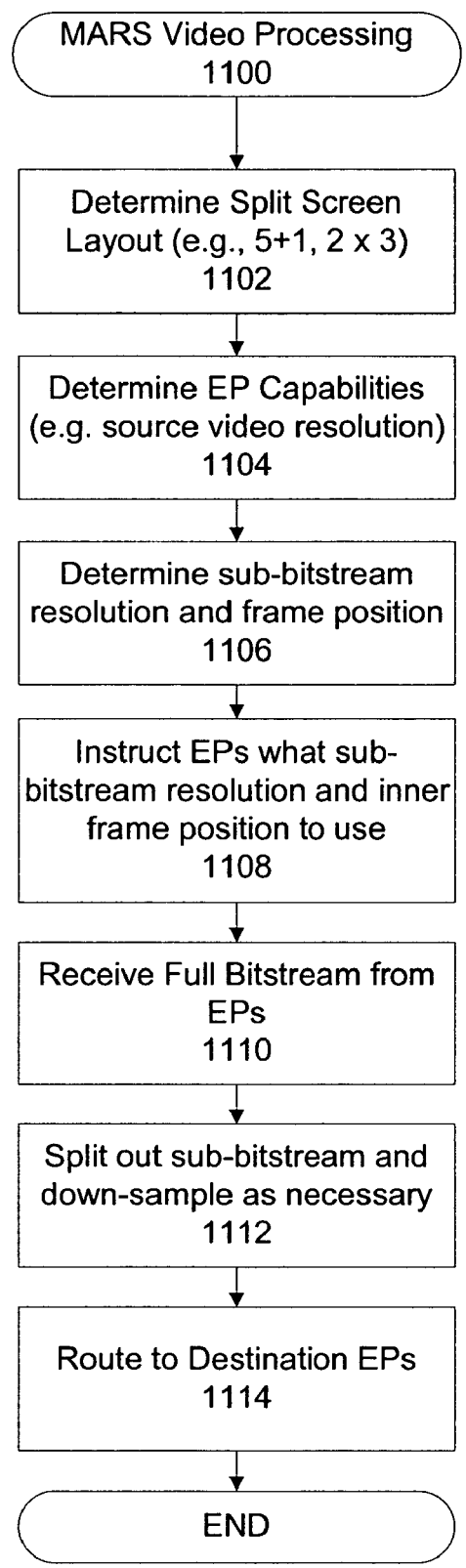
FIG. 11 illustrates an embodiment of video processing method.

FIG. 11 illustrates an embodiment of a video processing method 1100. For one embodiment, the method 1100 is implemented by MARS 902 of FIG. 9. At operation 1102, the split screen (SS) window layout is determined. The SS layout may be manually specified by a user that controls the video conference session, such as a chairperson, moderator, or administrator of the video conference (collectively referred to herein as the "chairperson"). The chairperson may communicate with the MARS over a network to control the video conference session. Alternatively, MARS 902 may automatically determine a SS window layout, for example, based on the number of participant end points. Numerous split screen window layouts are contemplated for use with embodiments of the invention. For example, a split screen layout may be in any of a 5+1 (five areas of the same size, with one larger area) as illustrated by EP 920 of FIG. 9), 1×1, 2×1, 2×2, 2+1, 3+1, 2×3 (i.e. two areas tall by three areas wide, all areas being the same resolution), 3×2, 8+1, among other configurations. For another embodiment, the position for each end point within the split screen window is determined automatically and on-the-fly by voice activated selection (VAS) as described above.

At operation 1104, the MARS determines the processing capacity/capabilities for each of the participant end points, as well as their connection bandwidths to the MARS. For example, the MARS will determine the resolution that each end point may capture source video at.

At operation 1106, the sub-bitstream resolution and inner region of the video frame is determined for each participant end point. For an embodiment, the MARS automatically determines the sub-bitstream resolution for each end point, based on the position of the end point video content within the SS window layout. For another embodiment, the MARS automatically determines the position of the inner region represented by the sub-bitstream. For example, the MARS automatically centers the inner region with respect to the full frame, and aligns the boundaries of the inner region along macroblock (MB) boundaries within the video frame. For an alternative embodiment, the MARS also can shift the inner region position up, down, left or right in the full frame, to accommodate subjects which are off-center in the frame, while still aligning the inner region along MB boundaries. Alternatively, once MARS determines the resolution of the inner region, a user such as a chairperson, manually positions the inner region with respect to the full frame to fit as much of the subject (e.g. an image of a participant) within the inner region, provided the boundaries of the inner size align with the MB boundaries of the video frame. It should be noted that to improve performance, arbitrary positions of the inner size boundaries are not permitted; rather, the inner size boundaries are aligned along MB boundaries for ease of processing, as will be described further below. Because a macroblock size (e.g. 16×16 pixels) is relatively small compared to the entire frame size, requiring the inner size to be aligned along MB boundaries does not result in a significant loss in scene. Additional details of operation 1106 are described below, with respect to FIG. 12.

At operation 1108, the MARS informs each of the participant end points which sub-bitstream resolution to encode at, as well as the position of the inner region of the video frames with respect to the full frame. Each end point encodes its source video based on the setup information provided by the MARS.

Each respective end point then encodes its video sequence as directed by the MARS at operation 1108. At operation 1110, the MARS receives the full bitstream from each of the respective end points. At operation 1112, the MARS processes each of the received bitstreams to generate an output bitstream. One type of processing the MARS can perform is to split out the sub-bitstream from a received bitstream, then transmit only the sub-bitstream to one or more destination endpoints. It should be noted that this entails simply dropping portions of the bitstream that are not within the sub-bitstream, and does not require decoding or re-encoding of the bitstream, as will be described below in greater detail. Alternatively, and depending on the characteristics of the source endpoint and its position in the split screen of the destination endpoint, the MARS may split out a sub-bitstream, then downsample the sub-bitstream, and re-encode it to an output bitstream. Additionally, the MARS may downsample the full bitstream received from a source end point, then re-encode it to an output bitstream.

At operation 1114, the MARS then transmits each of the respective output bitstreams to the one or more destination end points. Thus, a single destination endpoint may receive multiple input bitstreams, which are then displayed together at the end point within a split screen layout.

Figure 12:
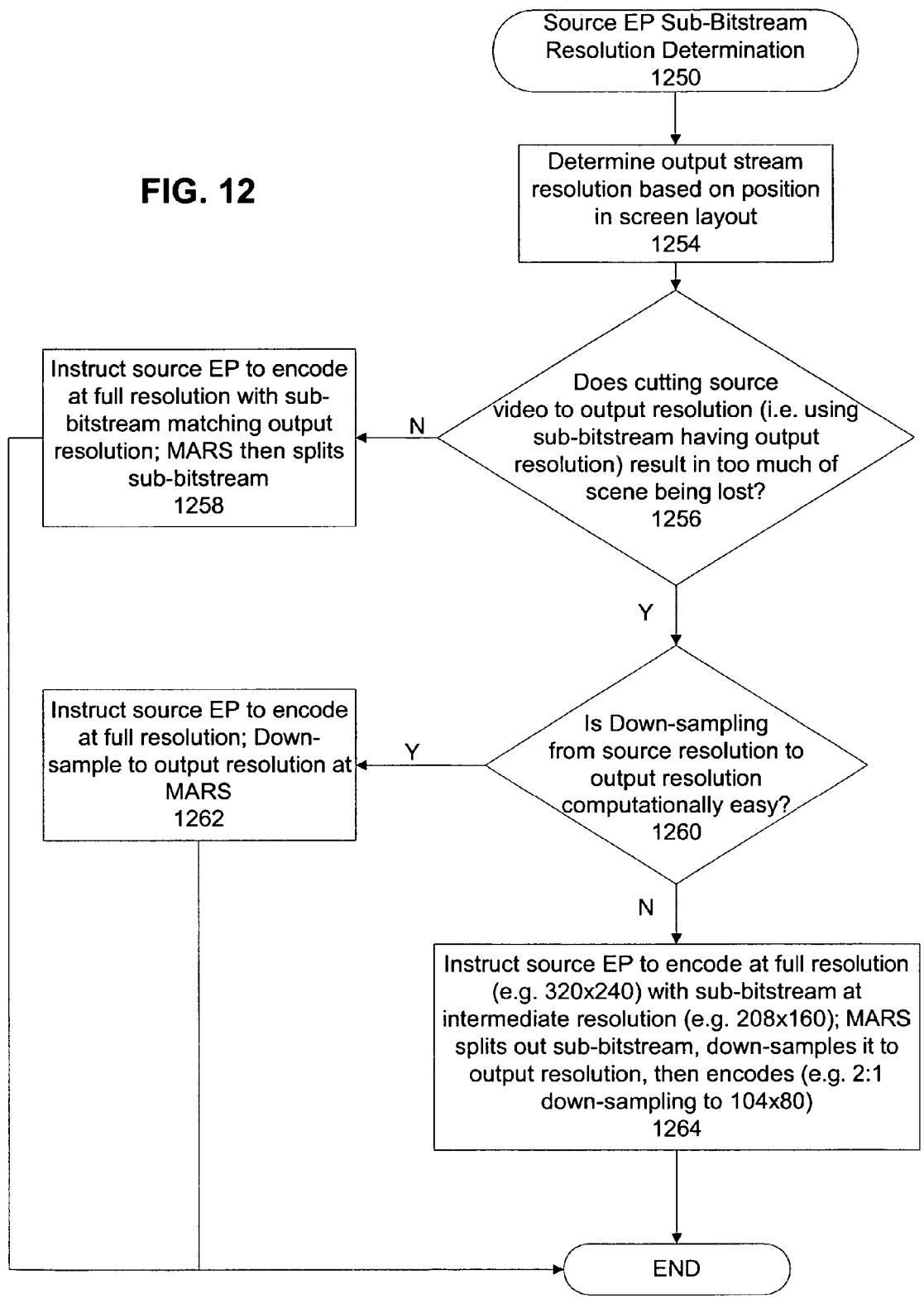
FIG. 12 illustrates a method used by the multimedia application routing server to determine encoding for each end point.

FIG. 12 illustrates a method 1250 used by the MARS to determine encoding for each end point. This method can be performed at operation 1106 of FIG. 11. For clarity, the method 1250 is described in FIG. 12 with respect to a single source end point. However, the method 1250 is performed for each end point participating in the multimedia communication session.

Initially, the MARS is aware of the end point's capabilities from the determination made at operation 1104 of FIG. 11. Referring to FIG. 12, at operation 1254, for each source end point, the MARS determines an output resolution (from the MARS to the destination end point) based on the source end point's corresponding position in the split screen layout of the destination end point, as well as the total size specified for the split screen window on the destination end point. For example, referring to the 5+1 split screen layout 920 of FIG. 9, end point 904 corresponds to the largest region within the split screen layout. For one embodiment, pre-defined resolution ratios (dimensions) for each position within a split screen window configuration may be stored on the MARS, so that once a source end point is assigned to a particular position within the split screen window, its output resolution from the MARS can be automatically determined from a given total split screen window size.

At operation 1256, the method 1250 determines whether cutting (i.e. cropping) the video frame from the end point's full source resolution to the MARS output resolution would result in too large a portion of the scene being lost. In other words, the determination is whether discarding an outer border of pixels for the source video frame would result in significant picture information being lost (e.g. would the subject user's entire head be visible?). This determination may be made automatically by the MARS, for example by setting a threshold ratio of source resolution to output resolution that should not be exceeded. Alternatively, a user such as a chairperson, may make a determination whether too much scene is lost by cutting the frame to the output resolution.

If the answer at operation 1256 is no (i.e. cutting is acceptable), then the process flow proceeds to operation 1258, where the MARS instructs the source EP to encode video at full resolution, while using a sub-bitstream matching the output resolution used at the destination endpoint. Again, using end point 904 of FIG. 9 as an example, if the answer at operation 1256 is no, then MARS 902 would instruct end point 904 to encode its source video at 320×240 pixels (full resolution) with a sub-bitstream of 208×160 pixels (a size matching the corresponding region within the destination end point split screen 920).

If the answer at operation 1256 is yes, then operation 1260 determines whether down-sampling from the end point's full source resolution to the MARS output resolution would be computationally easy. By computationally easy, it is meant that down-sampling would not require excessive computation at MARS; an example of a computationally easy down-sampling is 2:1 down-sampling.

If the answer at operation 1260 is yes (i.e. down-sampling is easy), then the process flow proceeds to operation 1262, where the MARS instructs the source end point to encode video at its full resolution. In such a case, the MARS would then down-sample the received bitstream to the output resolution.

If the answer at operation 1260 is no, then the process flow proceeds to operation 1264. At operation 1264, the MARS instructs the source end point to encode video at its full resolution, using a sub-bitstream at an intermediate resolution. By intermediate resolution, it is meant that resolution of the inner region of the frame encoded by the sub-bitstream has a resolution less than the full resolution of the source, but larger than the resolution within the destination end point split screen (i.e. the MARS output resolution). Upon receiving the encoded video from the source end point, MARS would split out the sub-bitstream, then down-sample the sub-bitstream to the output resolution. Using end point 912 of FIG. 9 as an example, performing operation 1264 with respect to end point 912 would result in end point 912 encoding video at 320×240 pixels resolution, with a sub-bitstream having a resolution of 208×160 pixels. In this case, 208×160 pixels would be the intermediate resolution. Upon receiving the bitstream from the source end point 912, MARS would split out the 208×160 pixel sub-bitstream, then perform 2:1 down-sampling on the sub-bitstream to yield 104×80 pixel output bitstream, which matches the allocated resolution within the corresponding region of the destination end point split screen window.

Figure 13:
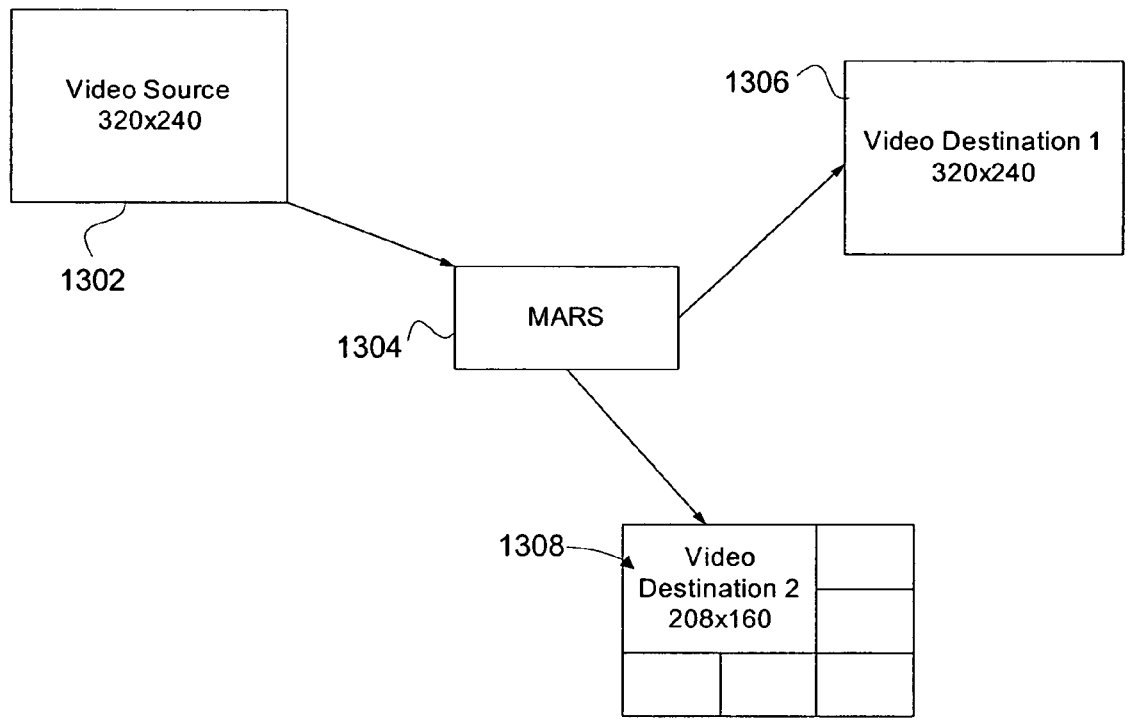
FIG. 13 illustrates a video source delivered to two different destination end points.

FIG. 13 illustrates an embodiment of a video source 1302 that is delivered via MARS 1304 to two different destination end points 1306, 1308 in two different resolutions (alternatively, the video source may be delivered via the MARS to a single destination end point with two different resolutions). One of the destinations 1306 requires the full size of the video source 1302, while the other destination 1308 requires a portion of the source video to be put into a split screen video window. The source video frame includes an inner size (e.g. 208×160 pixels) as well as an outer size (e.g. 320×240 pixels), similar to that illustrated in FIG. 10.

As described above, for an embodiment, bitstream domain video splitting (BDVS) is used to encode the video source 1302, which encodes for the full frame resolution (e.g. 320× 240 pixels), as well as an inner region (e.g. 208×160 pixels) via a sub-bitstream. In order to ensure proper encoding of the sub-bitstream, there are certain video encoding considerations that are implemented by an encoder at the video source 1302.

Figure 10:
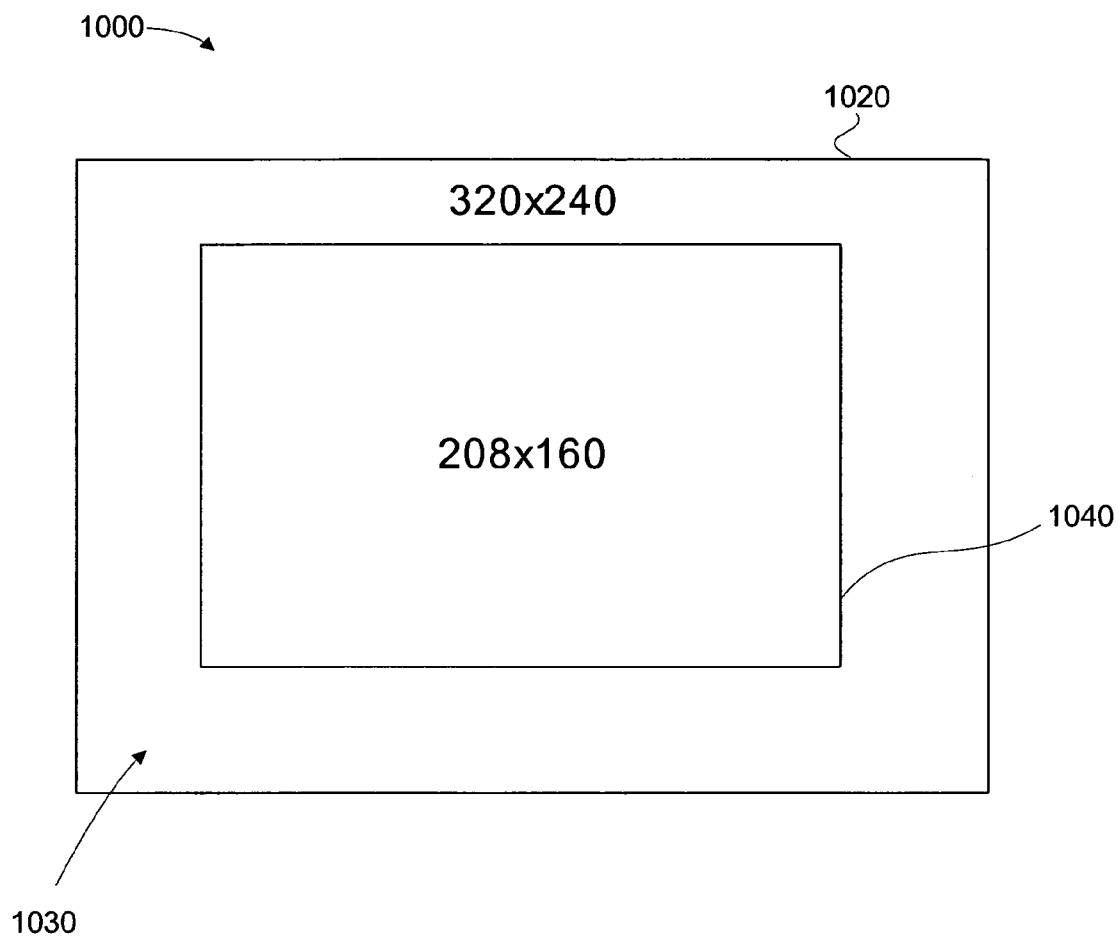
FIG. 10 shows an embodiment of a video frame.

One consideration is the manner in which motion estimation is implemented in the video encoding. In video encoding, motion estimation is an image compression process of analyzing previous or future frames to identify blocks that have not changed or have only changed location; motion vectors are then stored in place of the blocks. Referring to FIG. 10, for an embodiment of the invention, a motion estimation algorithm is implemented such that the inner size video 1040 may be decoded without relying on the pixels 1030 outside the inner size video to predict motion. To accomplish this, the video source 1302 encoder's motion estimation algorithm for boundary macroblocks in the inner video 1040 does not search outside 1030 the inner size area. Thus, for an embodiment, the end point encoding is performed in a manner such that upon decoding, the sub-bitstream can be decoded by itself (i.e. internally), without relying on pixels outside the inner portion or portions of the bitstream that are outside the sub-bitstream. Macroblocks are 16×16 blocks of pixels within a video frame. Boundary macroblocks are macroblocks completely within the inner size 1040 which have at least one edge defined by the boundary of the inner size 1040.

Another consideration is motion vector coding. A motion vector is a two-dimensional vector used for motion compensation that provides an offset from the coordinate position in the current picture to the coordinates in a reference picture. Because most video coding techniques code motion vector difference instead of a motion vector itself, for an embodiment of the invention, the motion vector for a macroblock immediately outside the inner size 1040 shall be zero so that the motion vector difference for a macroblock immediately inside the inner size 1040 is equal to the motion vector itself.

Quantizer Coding is another consideration. A quantizer is a construct that takes an amplitude-continuous signal and converts it to discrete values that can be reconstructed by a decoder. Quantizers are used to remove information, redundancy, and irrelevancy from a signal. Because most video coding techniques code quantizer difference, instead of a quantizer itself, for an embodiment of the invention, the quantizer difference shall be zero for every macroblock in the frame 1000 before the first macroblock inside the inner size 1040.

Figure 14:
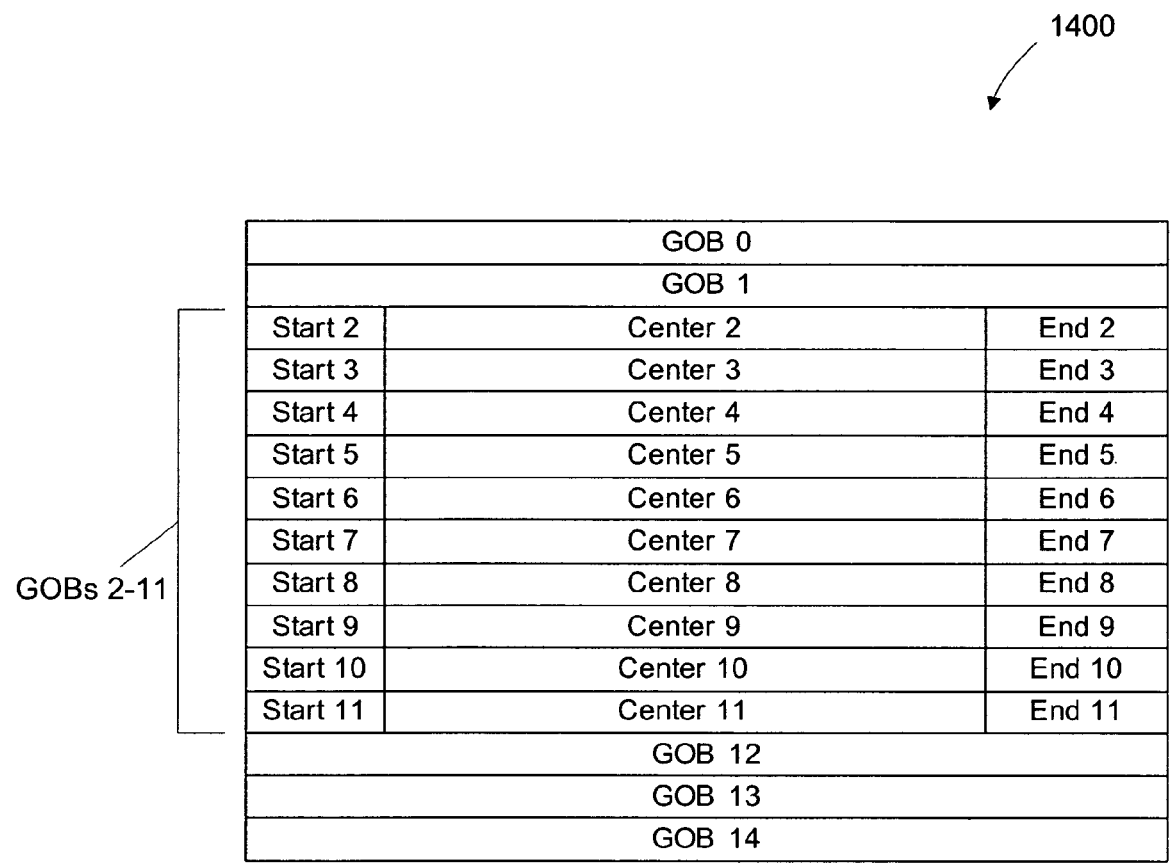
FIG. 14 illustrates an encoding structure for a video frame.

An embodiment of the video bitstream syntax for Bitstream Domain Video Splitting (BDVS) is now described. FIG. 14 illustrates an encoding structure for a video frame 1400, as encoded by an embodiment of the invention using BDVS. By way of example, the video frame 1400 represents the full video frame at a resolution of 320×240 pixels. The frame 1400 is divided into fifteen rows, each row referred to as a group of blocks (GOB), each of which consists of a single row of twenty macroblocks. Each macroblock (MB) is a 16×16 block of pixels. An inner size region of frame 1400 is defined collectively by the group of center MBs labeled as Center 2 through Center 11. The GOB and MB dimensions depend on the particular encoding technique implemented. Other dimensions can be used with embodiments of the invention.

In order to split the inner size bitstream out of the bitstream of a video frame 1400 without decoding the bitstream of the entire video frame 1400, four values are signaled to a MARS to perform the split operation. With these values, the MARS can simply cut out the sub-bitstream from the full bit-stream. These values are signaled via a BDVS header on the bitstream sent from the video source to a MARS. As illustrated in FIG. 14, the four values are (1) the number of start GOBs that may be cut out (e.g., GOB 0 and GOB 1); (2) the number of center GOBs that shall remain (e.g., GOB 2 to GOB 1); (c) the number of start bits within each remaining GOB (e.g., Start 2 to Start 11) which may be cut out; and (d) the number of center bits within each remaining GOB (e.g., Center 2 to Center 11), which shall remain. Collectively, these four values indicate to the MARS where the inner region is within the bitstream, and which portion of the bitstream can be dropped to yield only the inner size.

The first two values need to be signaled only once per channel by specifying the inner size and outer size. For each encoded GOB, a GOB number is carried before the bitstream of the GOB to identify the particular GOB. For example, if the GOB number is 0, 1, 12, 13, or 14 in the case illustrated in FIG. 14, the MARS can discard these GOBs for an output channel to a destination EP that only needs the inner size video. If the GOB number is between 2 and 11 inclusive, the MARS checks further inside the BDVS header to find the last two values for the GOB.

Figure 15:
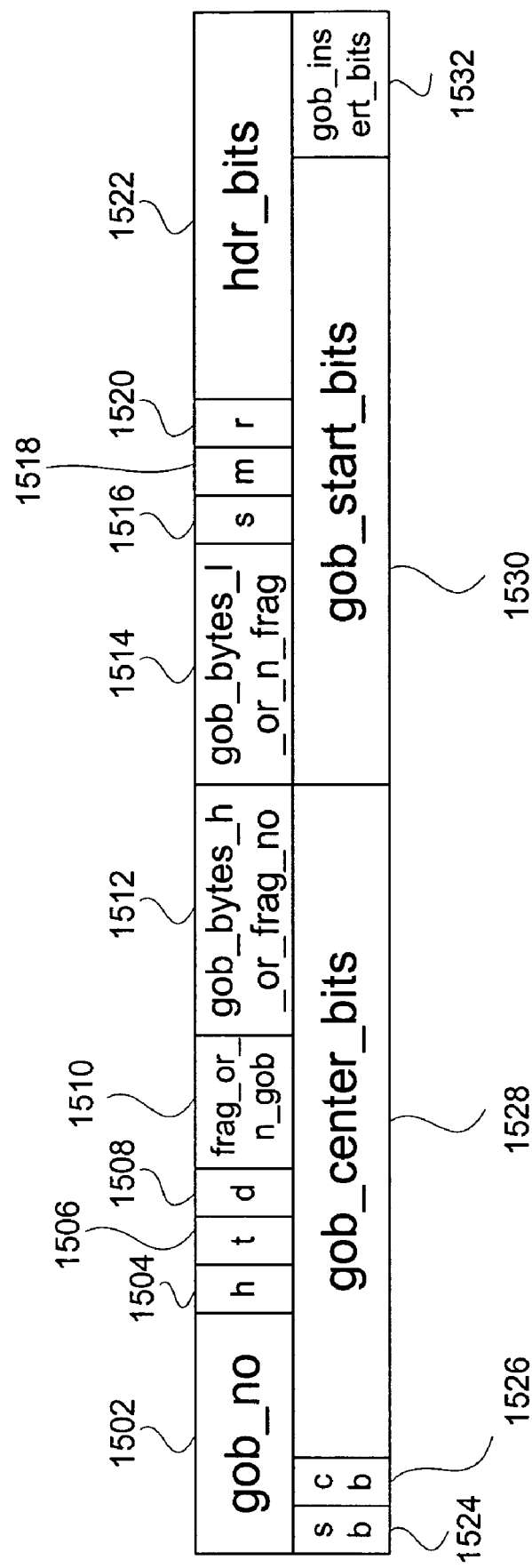
FIG. 15 illustrates an embodiment of a bit stream domain video split header syntax.

FIG. 15 illustrates an embodiment of the BDVS header syntax. The BDVS header is appended to data packets for each GOB sent from the source to the MARS. For an embodiment of the invention, the BDVS header is embedded in the bitstream sent from the source end point to the MARS. The semantics of the header syntax are now described by reference to each field.

The field gob_no 1502 is a 5-bit unsigned integer ranging from 0 to 31 and indicating the GOB number.

The field h 1504 is a 1-bit flag with 1 indicating a packet containing picture header or 0 indicating a packet containing GOB header.

The field t 1506 is a 1-bit flag with 1 indicating a packet containing data in an inter picture or 0 indicating a packet containing data in an intra picture.

The field d 1508 is a 1-bit flag with 1 indicating differential coding information in the packet or 0 indicating no differential coding information in the packet.

The field frag_or_n_gob 1510 is a 3-bit unsigned integer with a value 0 indicating a packet carrying a fragment of a GOB or a non-zero value ranging from 1 to 7 indicating the number of GOBs carried in the packet. Note that this limits the number of GOBs that can be packed into one packet to 7.

The field gob_bytes_h_or_frag_no 1512 is a 5-bit unsigned integer. Its meaning depends on whether the packet carries non-fragmented GOB(s) or a fragment of a GOB, as indicated by frag_or_n_gob 1510. If the packet carries non-fragmented GOB(s), these 5 bits are the high 5 bits of a 10-bit integer that indicates the number of bytes in the GOB. If the packet carries a fragment of a GOB, this field specifies the fragment sequence number ranging from 0 to 31.

The field gob_bytes_1_or_n_frag 1514 is a 5-bit unsigned integer. Its meaning depends on whether the packet carries non-fragmented GOB(s) or a fragment of a GOB, as indicated by frag_or_n_gob 1510. If the packet carries non-fragmented GOB(s), these 5 bits are the low 5 bits of a 10-bit integer that indicates the number of bytes in the GOB. If the packet carries a fragment of a GOB, this field specifies the number of fragments minus 1. Note that, according to the above definitions, there are two different ways to signal a packet with exactly one GOB: (a) frag_or_n_gob is set to 0 and gob_bytes_1_or_n_frag is set to 0, and (b) frag_or_n_gob is set to 1. It is better to use (b) since it involves only one field of syntax to make the decision. Another note is that, when frag_or_n_gob is non-zero, the number of bytes in the GOB is calculated as (gob_bytes_h_or_frag_no <<5)+ gob_bytes_1_or_n_frag.

The field s 1516 is a 1-bit flag with 1 indicating a switch of reference frame to the backup frame or 0 indicating use of previous frame as the reference frame.

The field m 1518 is a 1-bit flag with 1 indicating a move of the temporary frame to the backup frame or 0 indicating not moving the temporary frame to the back up frame.

The field r 1520 is a 1-bit flag with 1 indicating saving the current reconstructed frame into the temporary frame memory or 0 indicating not saving the current reconstructed frame into the temporary frame memory.

The field hdr_bits 1522 is an 8-bit unsigned integer indicating the number of bits for either the picture header or the GOB header, depending on the 1-bit flag h. When h is 1, this field indicates the number of bits in the picture header. When h is 0, this field indicates the number of bits in the GOB header. Note that the splitting operation requires both picture header bits and GOB header bits for the first GOB of the inner picture and the picture header bits have to be stored when the first GOB of the inner picture is not the same as the first GOB of the outer picture.

The field sb 1524 is a 1-bit flag with 1 indicating a packet containing the start bits of a GOB in differential coding or 0 indicating a packet not containing the start bits of a GOB in differential coding.

The field cb 1526 is a 1-bit flag with 1 indicating a packet containing the center bits of a GOB in differential coding or 0 indicating a packet not containing the center bits of a GOB in differential coding. Note that (a) sb=0 and cb=0 indicates a packet with all bits being the end bits of a GOB in differential coding; (b) sb=1 and cb=0 indicates a packet with all bits being the start bits and no center bits of a GOB in differential coding; (c) sb=0 and cb=1 indicates a packet with no start bits and all bits being the center bits plus possibly some (or all) end bits of a GOB in differential coding; and (d) sb=1 and cb=1 indicates a packet with all start bits and some (or all) center bits plus possibly some (or all) end bits of a GOB in differential coding. For a non-fragmented GOB, sb=1 and cb=1 is the only possible setting, even the number of start bits is zero.

The field gob_center_bits 1528 is a 14-bit unsigned integer indicating the number of center bits contained in the packet for a GOB in differential coding.

The field gob_start_bits 1530 is a 13-bit unsigned integer indicating the number of start bits contained in the packet for a GOB in differential coding.

The field gob_insert_bits 1532 is a 3-bit unsigned integer indicating the number of inserted bits between the (picture or GOB) header and data after splitting a differentially coded GOB.

The syntax elements described above and illustrated in FIG. 15 serve various purposes. However, the following syntax elements described above are particularly useful in implementing BDVS: gob_no, d, hdr_bits, sb, cb, gob_center_bits, gob_start_bits, and gob_insert_bits.

Figure 16A:
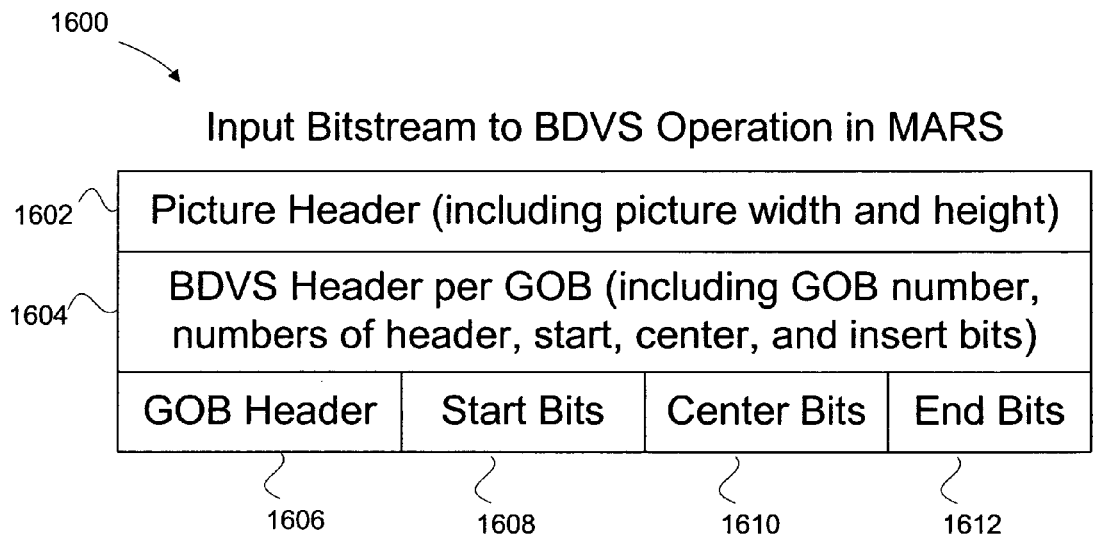
FIG. 16A illustrates an input bitstream to a multimedia application routing server.
Figure 16B:
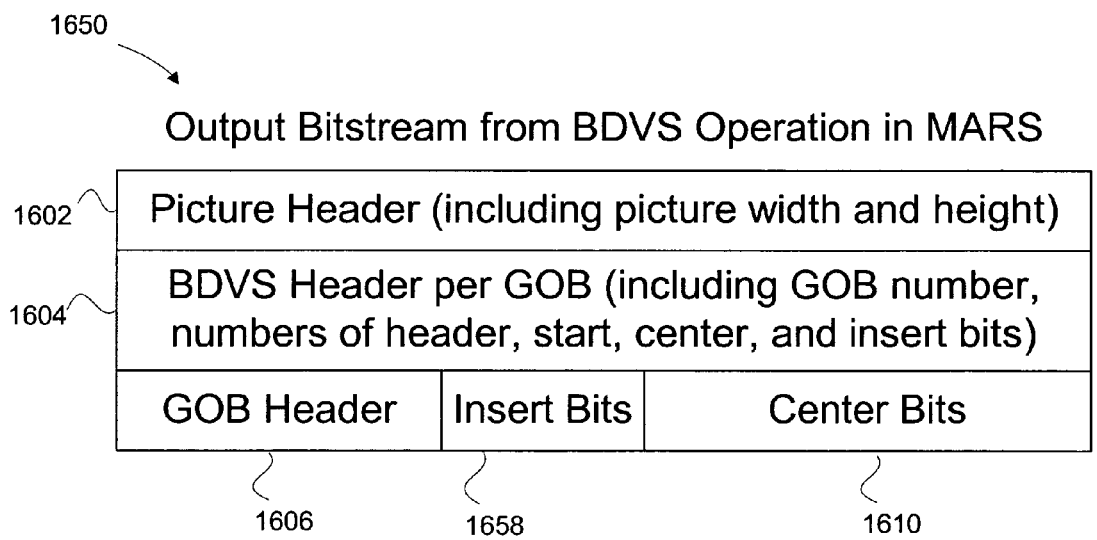
FIG. 16B illustrates an output bitstream to a multimedia application routing server.

FIGS. 16A and 16B illustrate bitstream structures before 1600 and after 1650 a split operation is performed in the MARS. FIG. 16A illustrates an input bitstream 1600 (from a video source end point to the MARS) to a BDVS operation in a MARS. For the embodiment illustrated, the bitstream 1600 encodes for a single GOB. The bitstream 1600 includes a picture header 1602 (including picture width and height), a BDVS header 1604 per GOB (including the GOB number, as well as the numbers of header bits, start bits, center bits and insert bits), the GOB header 1606, and the actual Start Bits 1608, Center Bits 1610 and End Bits 1612. The Start Bits 1608, Center Bits 1610 and End Bits 1612 collectively form a GOB.

FIG. 16B illustrates an output bitstream 1650 from a BDVS operation in the MARS. This output bitstream is transmitted from the MARS to an endpoint which presents only the split-out inner size of the full video frame. Thus, the bitstream encodes only for the inner size of the video picture. As described above, this output bitstream is the result of the MARS discarding portions of the picture outside the inner size, without having to decode the bitstream. Thus certain elements of the input bitstream 1600 are preserved in the output bitstream 1650. The bitstream 1650 includes the picture header 1602, the BDVS header 1604 per GOB, the GOB header 1606, insert bits 1658, and the center bits 1610. It should be noted that only the center bits 1610 of the picture are needed to reproduce the inner size. Because the Center Bits 1610 may not be byte-aligned, Insert Bits 1658 are used in the output bitstream 1650 to align them. The MARS generates these Insert Bits 1658, since having the center bits aligned allows use of byte-copy, while avoiding using bit-copy, to obtain the output bitstream 1650. On the decoding side (i.e., a destination EP), the decoder checks the syntax element 1532 for the number of Insert Bits, and discards them.

Figure 17A:
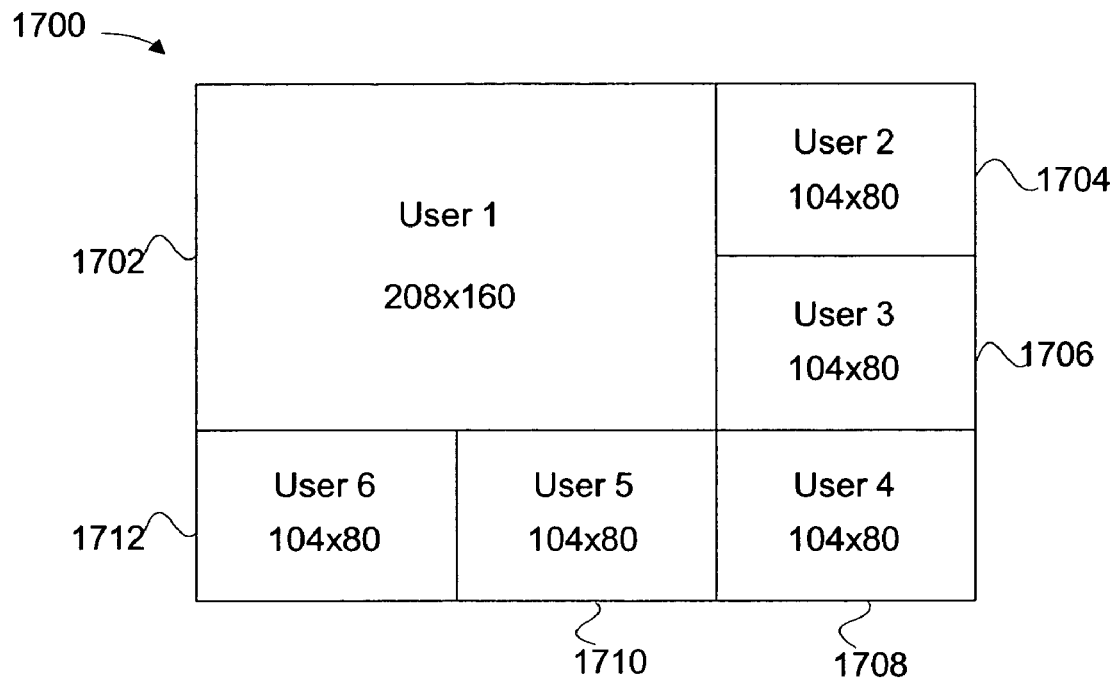
FIGS. 17A and 17B illustrate split screen (SS) windows displayed on a monitor at an end point.

FIG. 17A illustrates a split screen (SS) window 1700 displayed on a monitor at an end point. Source video corresponding to multiple end points (users) are displayed in a split screen (SS) window. By way of example, a 5+1 split screen format is illustrated, but other formats are contemplated. The individual component areas or positions 1702, 1704, 1706, 1708, 1710 and 1712 of the SS window 1700 each correspond to an individual bitstream received by the destination end point from the MARS. A conference chairperson is a user who controls or administrates various characteristics of a video conference. One of the characteristics that the chairperson may control is the layout of the SS window 1700 for all participant end points (i.e. all destination end points). The layout not only includes the multi-screen format (e.g. 5+1, 3×2, etc.), but also includes the positional arrangement of the individual video sources within the SS window 1700 (e.g. User 2's video is to be displayed in the upper right corner area of SS window 1700, etc.).

Figure 17B:
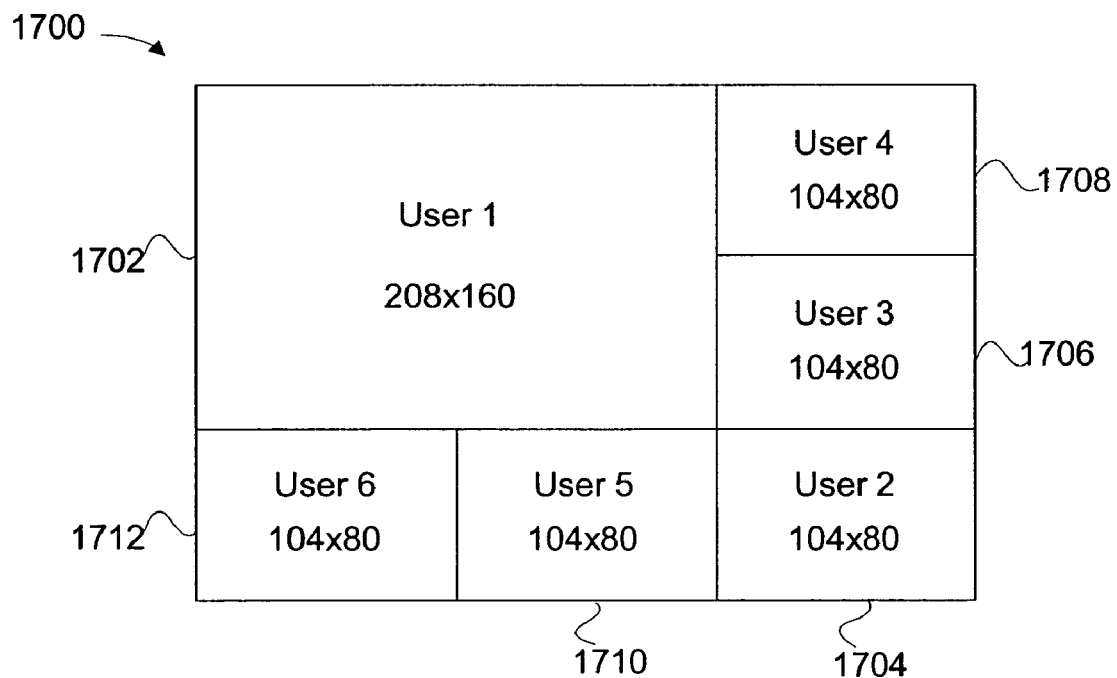

For an embodiment of the invention, a chairperson interacts with the MARS through a graphical user interface to arrange the position of source video within the SS window 1700. A "drag and drop" user interface ("D&D") is provided to allow the chairperson to arrange the positions of source video, for example, by using a mouse or other pointing device, selecting (e.g., "clicking on") a first area within the SS window 1700, dragging the selected area to a new desired position within the SS window 1700, then dropping or deselecting (e.g. releasing the mouse button) onto the desired area to insert the selected area in a new position within the SS window 1700. The video that originally occupied the new position is moved or switched to the old location of the dropped video; hence, this operation may be referred to as a "drag and switch." The position of any given user (end point video) in the SS window can be rearranged by the chairperson using the mouse to "drag" it from its original position and "drop" is to a new position. In place of a chairperson, a user who controls a session token may rearrange their own SS window, and this same rearrangement will be made for all viewers by a single user with a single D&D action. For example, performing a D&D operation on the SS window 1700 by dragging area 1708 then dropping it substantially over area 1704 would result in areas 1708 and 1704 being switched, as illustrated in FIG. 17B.

As another example, referring to FIG. 9, a chairperson can use the drag and drop feature to set up a video conference such that the source video for end point 906 is to be displayed in the upper left corner of the 5+1 layout of the destination end point 920, at a resolution of 208×160 pixels. Because the source EP 906 only captures video at a resolution of 176×144 pixels, which is less than the resolution allotted for the upper left corner of the split screen window at destination 920 (e.g. 208×160 pixels), MARS does not need to cut out the sub-bitstream from the bitstream 906A received from EP 906. Rather, the MARS may simply forward the received bitstream to the destination end point. Thus, for an embodiment of the invention, the source end point encodes its video at two levels (full size and inner size), and the bitstream may then be decoded by the destination end point at either of two levels (full size or inner size).

Because the resolution of the full bitstream 176×144 pixels is less than the split screen window's allotted space of 208× 160 pixels, the destination end point may simply fill the remaining space with black space. It should be noted that if this D&D operation causes the video for end point 904 to be switched to the previous location of end point 906 video within the split screen, the MARS would down-sample the 208×160 pixels resolution sub-bitstream received from end point 904 to a resolution of 104×80 pixels.

A chairperson may also use the D&D user interface feature to remove a source video from the SS window. For example, if area 1708 is dragged then dropped outside of window 1700, the corresponding area 1708 within the window 1700 will not display video content (e.g., it will appear black).

Figure 18A:
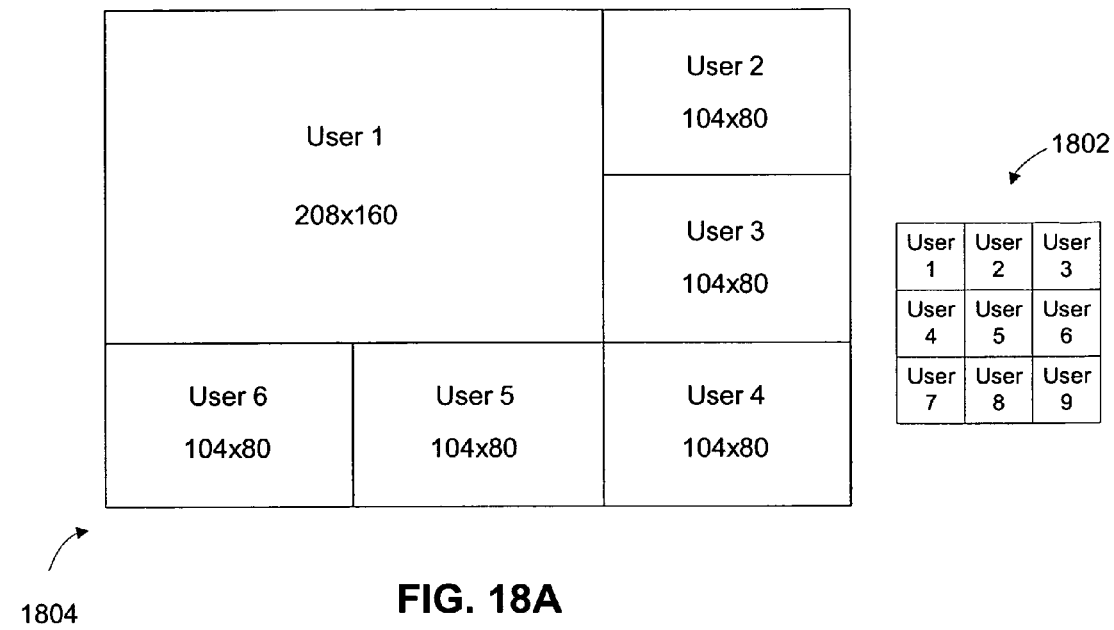
FIGS. 18A and 18B illustrate a split screen window and a thumbnail window in a graphical user interface.

For another embodiment, a source video for an end point user who is not currently displayed in the SS window 1700 can be added into the SS window 1700 via a D&D mechanism. Referring to FIG. 18A, a graphical user interface on a chairperson's monitor includes a thumbnail window 1802 in addition to the SS window 1804. The thumbnail window 1802 displays low resolution images that are refreshed at a relatively low rate (e.g. 1 or 2 times a second), and which are received from the source end points using a stateless protocol, in which no provision is made for acknowledgement of packets received. These images correspond to each participant in the video conference, regardless of whether their source video is displayed in the SS window or not. This allows participants and the chairperson to have a visual reference of all the participants in the conference, even though the main focus may be on the participants whose video is displayed within the SS window.

Figure 18B:
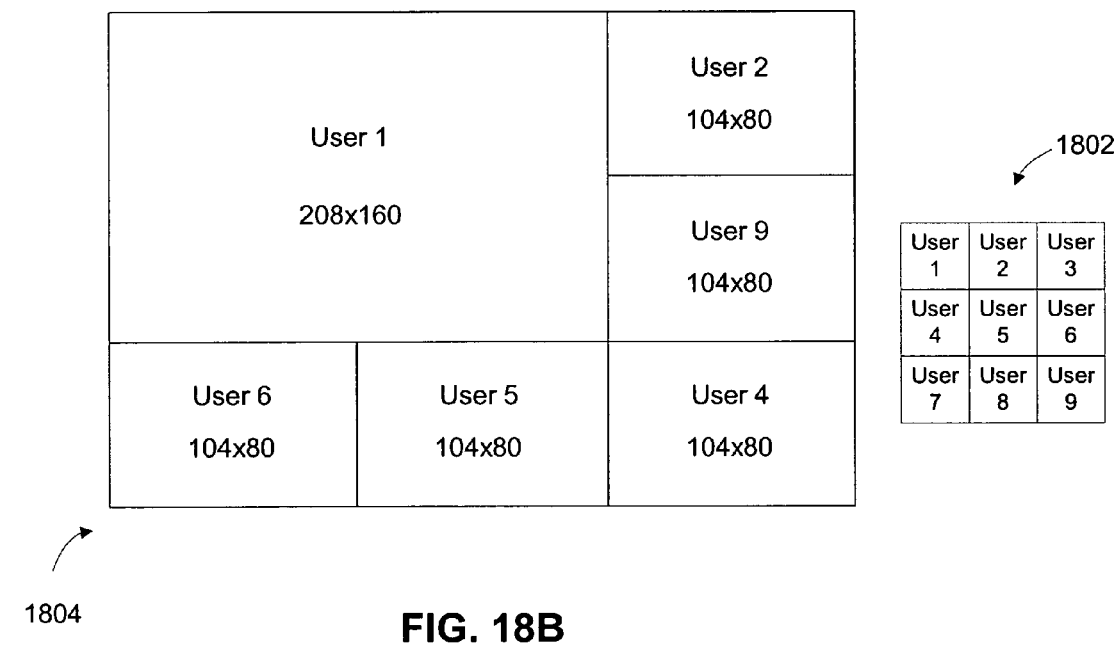

The chairperson can drag an image from the thumbnail window 1802 and drop it into the SS window 1804 to cause source video corresponding to that user to be displayed in the SS window 1804 at a desired position. For example, if there is a blank or unoccupied portion in the SS window, the chairperson may fill this portion by dragging a user from the thumbnail window 1802 into the SS window 1804. The thumbnail window will still contain a corresponding image for all participants in the video conference. In another example, the chairperson may remove an end point video (user) who is originally in the SS window by switching it with source video from another user. The chairperson drags a thumbnail image from thumbnail window 1802 into the SS window 1804, then drops the thumbnail at the desired location, causing any existing video source (if any) displayed at or occupying that location to be switched out (or removed) from the SS window 1804. If there is already an existing source video displayed at that location, the existing video source is removed from the SS window 1804 and replaced by the dropped source video. For example, referring to FIG. 18A, if a thumbnail corresponding to User 9 is dragged from thumbnail window 1802, and dropped onto the area of SS window 1804 corresponding to source video for User 3, the contents of the SS window 1804 will be changed to present source video for the User 9 end point in place of the User 3 source video, as illustrated in FIG. 18B. As also illustrated in FIG. 18B, thumbnail window 1802 remains unchanged after the drag and switch operation.

For an alternative embodiment, a chairperson can change the split screen layout of the video conference session by dragging one or more user thumbnails from the thumbnail window into the SS window. For example, upon dropping the thumbnails into the SS window, the layout of the SS window changes to accommodate the additional source(s). If the layout was in a 3×1 layout (three columns of screens by one row of screens), thereby displaying video for three end points, dropping a single additional user thumbnail into the SS window causes the SS window layout to be changed to a 2×2 layout. Additionally, other layouts can be used. For example, simultaneously dropping three additional user thumbnails onto the SS window can cause the SS window layout to change on the fly from, for example, a 3×1 layout to a 5+1 layout. However, when the layout for the SS window changes, each end point may need to change their encoding to reflect an appropriate inner size for the sub-bitstream. Additionally, frequent changing of the SS window layout can create pauses or otherwise impact the user experience. For these reasons, once a conference starts, the screen layout may remain the same for the duration of the conference. For an alternative embodiment, user's at each destination end point can use drag and drop features to arrange their split screen format as they desire, including which end point video is displayed within the split screen. In such a case, the MARS then routes the appropriate bitstream (full or sub-bitstream) to the respective end point.

For another embodiment, a "click-to-see" (CTS) feature is provided by a graphical user interface presented at an end point. Referring to FIG. 18A, an end point user/viewer can double click on (or otherwise select) a user/participant represented in the thumbnail window 1802. Upon double clicking a selected user, a separate new window appears to show the source video corresponding to the selected user/end point. The new window displays only the source video for the selected user/end point at the full resolution of the source as received by the MARS. This allows a user to focus on the video for a particular participant, regardless of whether video for the participant is displayed in the SS window for the conference session. This feature re-creates a real in-person conference situation, since it allows a user to observe other participants behavior (e.g. body language), even though the participant may not be actively participating or speaking in the conference. Alternatively, the new window may display only the inner size of the source video, as encoded by its sub-bitstream. Because the bitstream provided to the MARS by the source end point encodes for both the full frame resolution and the inner size resolution, the single bitstream can accommodate presentation of both small size video (e.g. as presented in an SS window) and large size video (i.e. the full frame resolution as presented by the CTS feature).

A viewer can also double click on any of the source video for the end points displayed within the SS window 1804, to spawn a separate window of just the selected user/end point video. Again, the separate window presents the full frame resolution source video for the selected user. Because the SS window 1804 contains video content for many users, the video of some users/end points in the SS window 1804 may be truncated/cut or down-sampled in order to fit into the SS window. The CTS feature allows the viewer to focus on any particular user in the SS window 1804, by viewing a full scene and possibly a higher resolution of the source video (as encoded by the full bitstream received at the MARS) than compared to its sub-bitstream form within the SS window 1804.

Various encoding and decoding schemes may be used with embodiments of the invention. For an embodiment of the invention, the H.263 standard published by the International Telecommunications Union (ITU) is used as a codec. H.263 is an ITU standard for compressing a videoconferencing transmission. It is based on H.261 with enhancements that improve video quality. H.263 supports CIF, QCIF, SQCIF, 4CIF and 16CIF resolutions. Other codecs such as the MPEG-1, MPEG-2, MPEG-4, H.261, H.264/MPEG-4 Part 10, and AVS (Audio Video coding Standard) may also be used with other embodiments.

In practice, the methods described herein may constitute one or more programs made up of machine-executable instructions. Describing the method with reference to the flow charts enables one skilled in the art to develop such programs, including such instructions to carry out the operations (acts) represented by the logical blocks on suitably configured computer or other types of processing machines (the processor of the machine executing the instructions from machine-readable media). The machine-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not limited to any particular programming language. A variety of programming languages may be used to implement embodiments of the invention. Furthermore, it is common in the art to speak of software, in one form or another (i.e., program, procedure, process, application, module, logic, etc.), as taking an action or causing a result. Such expressions are merely a shorthand way of saying that execution of the software by a machine caused the processor of the machine to perform an action or produce a result. More or fewer processes may be incorporated into the methods illustrated without departing from the scope of the invention and that no particular order is implied by the arrangement of blocks shown and described herein.

Embodiments of the invention have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for encoding video comprising:
    capturing a video sequence at a full frame resolution;
    identifying boundaries for an inner region within frames of the video sequence, the inner region having a lower resolution less than the full frame resolution;
    encoding the video sequence at the full frame resolution into a bitstream;
    encoding the inner region at the lower resolution into a sub-bitstream;
    including the sub-bitstream in the bitstream;
    embedding data within the bitstream, the data identifying the sub-bitstream within the bitstream.

2. The method of claim 1, wherein the data is a header, the header specifying the inner region.

3. The method of claim 2, wherein the header comprises information specifying a number of Group of Blocks (GOBs) to discard, a number of center GOBs to remain, a number of start bits within each of the center GOBs to discard, and a number of center bits within each GOB to remain.

4. The method of claim 2, wherein the inner region is capable of being decoded from only the header and the sub-bitstream portion of the bitstream.

5. An apparatus for encoding video comprising:
    means for capturing a video sequence at a full frame resolution;
    means for identifying boundaries for an inner region within frames of the video sequence, the inner region having a lower resolution less than the full frame resolution;
    means for encoding the video sequence at the full frame resolution into a bitstream;
    means for encoding the inner region at the lower resolution into a sub-bitstream;
    including the sub-bitstream in the bitstream;
    means for embedding data within the bitstream, the data identifying the sub-bitstream within the bitstream.

6. The apparatus of claim 5, wherein the data is a header, the header specifying the inner region.

7. The apparatus of claim 6, wherein the header comprises information specifying a number of Group of Blocks (GOBs) to discard, a number of center GOBs to remain, a number of start bits within each of the center GOBs to discard, and a number of center bits within each GOB to remain.

8. The apparatus of claim 6, wherein the inner region is capable of being decoded from only the header and the sub-bitstream portion of the bitstream.

9. A machine-readable medium having instructions to cause a machine to perform a machine-implemented method comprising:
    capturing a video sequence at a full frame resolution;
    identifying boundaries for an inner region within frames of the video sequence, the inner region having a lower resolution less than the full frame resolution;
    encoding the video sequence at the full frame resolution into a bitstream;
    encoding the inner region at the lower resolution into a sub-bitstream;
    including the sub-bitstream in the bitstream;
    embedding data within the bitstream, the data identifying the sub-bitstream within the bitstream.

10. The machine-readable medium of claim 9, wherein the data is a header, the header specifying the inner region.

11. The machine-readable medium of claim 10, wherein the header comprises information specifying a number of Group of Blocks (GOBs) to discard, a number of center GOBs to remain, a number of start bits within each of the center GOBs to discard, and a number of center bits within each GOB to remain.

12. The machine-readable medium of claim 10, wherein the inner region is capable of being decoded from only the header and the sub-bitstream portion of the bitstream.

13. A method comprising:
receiving an encoded bitstream, the bitstream encoding for a video sequence at a full frame resolution;
identifying a sub-bitstream within the bitstream, the sub-bitstream encoding for an inner region within frames of the video sequence, the inner region having a first resolution lower than the full frame resolution; and
discarding bits of the bitstream to obtain the sub-bitstream.

14. The method of claim 13, further comprising:
down-sampling the sub-bitstream to a second resolution, the second resolution being lower than the first resolution.

15. The method of claim 13, further comprising:
transmitting the sub-bitstream to a destination end point for display within a split screen window.

16. The method of claim 13, wherein identifying the sub-bitstream comprises reading a header embedded in the bitstream, the header specifying the inner region.

17. The method of claim 13, further comprising:
appending a number of bits to the sub-bitstream to byte-align center bits within the sub-bitstream, the center bits encoding for a portion of the inner region;
appending a header to the sub-bitstream, the header including a value indicating the number of appended bits; and
transmitting the sub-bitstream, the appended bits, and the header to a destination end point.

18. An apparatus comprising:
means for receiving an encoded bitstream, the bitstream encoding for a video sequence at a full frame resolution;
means for identifying a sub-bitstream within the bitstream, the sub-bitstream encoding for an inner region within frames of the video sequence, the inner region having a first resolution lower than the full frame resolution; and
means for discarding bits of the bitstream to obtain the sub-bitstream.

19. The apparatus of claim 18, further comprising:
means for down-sampling the sub-bitstream to a second resolution, the second resolution being lower than the first resolution.

20. The apparatus of claim 18, further comprising:
means for transmitting the sub-bitstream to a destination end point for display within a split screen window.

21. The apparatus of claim 18, wherein means for identifying the sub-bitstream comprises means for reading a header embedded in the bitstream, the header specifying the inner region.

22. The apparatus of claim 18, further comprising:
means for appending a number of bits to the sub-bitstream to byte-align center bits within the sub-bitstream, the center bits encoding for a portion of the inner region;
means for appending a header to the sub-bitstream, the header including a value indicating the number of appended bits; and
means for transmitting the sub-bitstream, the appended bits, and the header to a destination end point.

23. A machine-readable medium having instructions to cause a machine to perform a machine-implemented method comprising:
receiving an encoded bitstream, the bitstream encoding for a video sequence at a full frame resolution;
identifying a sub-bitstream within the bitstream, the sub-bitstream encoding for an inner region within frames of the video sequence, the inner region having a first resolution lower than the full frame resolution; and
discarding bits of the bitstream to obtain the sub-bitstream.

24. The machine-readable medium of claim 23, wherein the method further comprises:
down-sampling the sub-bitstream to a second resolution, the second resolution being lower than the first resolution.

25. The machine-readable medium of claim 23, wherein the method further comprises:
transmitting the sub-bitstream to a destination end point for display within a split screen window.

26. The machine-readable medium of claim 23, wherein identifying the sub-bitstream comprises reading a header embedded in the bitstream, the header specifying the inner region.

27. The machine-readable medium of claim 23, wherein the method further comprises:
appending a number of bits to the sub-bitstream to byte-align center bits within the sub-bitstream, the center bits encoding for a portion of the inner region;
appending a header to the sub-bitstream, the header including a value indicating the number of appended bits; and
transmitting the sub-bitstream, the appended bits, and the header to a destination end point.

28. A method comprising:
identifying a split screen layout, the split screen layout for simultaneously presenting video sequences from a plurality of end points;
determining a capability of an end point, the capability including a first resolution for capturing a video sequence at the end point;
determining a second resolution for displaying the video sequence within the split screen layout, the second resolution being less than the first resolution;
determining whether cutting the video sequence from the first resolution to the second resolution is acceptable;
if the cutting is acceptable, instructing the end point to encode the video sequence into a bitstream at the first resolution, the bitstream including a sub-bitstream encoding for an inner region of the video sequence at the second resolution.

29. The method of claim 28, further comprising:
if the cutting is unacceptable, determining whether down-sampling the video sequence from the first resolution to the second resolution is acceptable;
if the down-sampling is unacceptable, instructing the end point to encode the video sequence into a bitstream at the first resolution, the bitstream including a sub-bitstream encoding for an inner region of the video sequence at an intermediate resolution, the intermediate resolution being between the first resolution and the second resolution.

30. The method of claim 29, further comprising:
receiving the bitstream including the sub-bitstream at the intermediate resolution;
extracting the sub-bitstream from the bitstream; and
down-sampling the sub-bitstream to the second resolution.

31. An apparatus comprising:
means for identifying a split screen layout, the split screen layout for simultaneously presenting video sequences from a plurality of end points;
means for determining a capability of an end point, the capability including a first resolution for capturing a video sequence at the end point;

means for determining a second resolution for displaying the video sequence within the split screen layout, the second resolution being less than the first resolution;

means for determining whether cutting the video sequence from the first resolution to the second resolution is acceptable;

if the cutting is acceptable, means for instructing the end point to encode the video sequence into a bitstream at the first resolution, the bitstream including a sub-bitstream encoding for an inner region of the video sequence at the second resolution.

32. The apparatus of claim 31, further comprising:

if the cutting is unacceptable, means for determining whether down-sampling the video sequence from the first resolution to the second resolution is acceptable;

if the down-sampling is unacceptable, means for instructing the end point to encode the video sequence into a bitstream at the first resolution, the bitstream including a sub-bitstream encoding for an inner region of the video sequence at an intermediate resolution, the intermediate resolution being between the first resolution and the second resolution.

33. The apparatus of claim 32, further comprising:

means for receiving the bitstream including the sub-bitstream at the intermediate resolution;

means for extracting the sub-bitstream from the bitstream; and down-sampling the sub-bitstream to the second resolution.

34. A machine-readable medium having instructions to cause a machine to perform a machine-implemented method comprising:

identifying a split screen layout, the split screen layout for simultaneously presenting video sequences from a plurality of end points;

determining a capability of an end point, the capability including a first resolution for capturing a video sequence at the end point;

determining a second resolution for displaying the video sequence within the split screen layout, the second resolution being less than the first resolution;

determining whether cutting the video sequence from the first resolution to the second resolution is acceptable;

if the cutting is acceptable, instructing the end point to encode the video sequence into a bitstream at the first resolution, the bitstream including a sub-bitstream encoding for an inner region of the video sequence at the second resolution.

35. The machine-readable medium of claim 34, wherein the method further comprises:

if the cutting is unacceptable, determining whether down-sampling the video sequence from the first resolution to the second resolution is acceptable;

if the down-sampling is unacceptable, instructing the end point to encode the video sequence into a bitstream at the first resolution, the bitstream including a sub-bitstream encoding for an inner region of the video sequence at an intermediate resolution, the intermediate resolution being between the first resolution and the second resolution.

36. The machine-readable medium of claim 35, wherein the method further comprises:

receiving the bitstream including the sub-bitstream at the intermediate resolution;

extracting the sub-bitstream from the bitstream; and down-sampling the sub-bitstream to the second resolution.

* * * * *